(12) United States Patent
Tsuru et al.

(10) Patent No.: US 7,909,446 B2
(45) Date of Patent: Mar. 22, 2011

(54) WATER-BASED INKS FOR INK-JET PRINTING

(75) Inventors: Isao Tsuru, Wakayama (JP); Koji Azuma, Wakayama (JP); Masato Hoshi, Wakayama (JP); Nobushige Tanaka, Wakayama (JP); Takehiro Tsutsumi, Wakayama (JP)

(73) Assignee: Kao Corporation, Tokyo (JP)

( * ) Notice: Subject to any disclaimer, the term of this patent is extended or adjusted under 35 U.S.C. 154(b) by 123 days.

(21) Appl. No.: 11/576,862

(22) PCT Filed: Oct. 6, 2005

(86) PCT No.: PCT/JP2005/018829
§ 371 (c)(1),
(2), (4) Date: Oct. 30, 2007

(87) PCT Pub. No.: WO2006/038727
PCT Pub. Date: Apr. 13, 2006

(65) Prior Publication Data
US 2008/0192098 A1      Aug. 14, 2008

(30) Foreign Application Priority Data

| Oct. 7, 2004 | (JP) | 2004-295463 |
| Oct. 29, 2004 | (JP) | 2004-316597 |
| Apr. 13, 2005 | (JP) | 2005-116277 |

(51) Int. Cl.
*C09D 11/00*   (2006.01)
(52) U.S. Cl. .................... 347/100; 106/31.13
(58) Field of Classification Search ............ 347/100; 106/31.13
See application file for complete search history.

(56) References Cited

U.S. PATENT DOCUMENTS

| 4,822,418 A | 4/1989 | Lin et al. |
| 4,912,157 A | 3/1990 | Clark et al. |

(Continued)

FOREIGN PATENT DOCUMENTS

JP   53 125104   11/1978

(Continued)

OTHER PUBLICATIONS

U.S. Appl. No. 11/576,862, filed Apr. 6, 2007, Tsuru, et al.

*Primary Examiner* — Laura E Martin
(74) *Attorney, Agent, or Firm* — Oblon, Spivak, McClelland, Maier & Neustadt, L.L.P.

(57) ABSTRACT

There are provided a water dispersion for ink-jet printing which contains a water dispersion of particles of a vinyl polymer or a polyester-based polymer which contain a colorant (B), and a water-insoluble organic compound (A) except for aliphatic acid derivatives; a water-based ink containing the water dispersion; a print obtainable by printing images or characters with the water-based ink; and a process for producing the water dispersion. Also, there are provided an ink set for ink-jet printing containing two or more kinds of inks having different colors from each other wherein the inks each contain a water dispersion of particles of a vinyl polymer or a polyester-based polymer which contain a colorant (B), and a water-insoluble organic compound (A) except for aliphatic acid derivatives; and a process for producing a print using the ink set. The water-based ink can provide multi-order color images or composite black images which exhibits a high optical density and is excellent in gloss and image clarity.

16 Claims, 3 Drawing Sheets

U.S. PATENT DOCUMENTS

| | | |
|---|---|---|
| 6,482,256 B1 * | 11/2002 | Kanaya et al. .............. 106/31.51 |
| 6,723,784 B2 | 4/2004 | Ito et al. |
| 6,758,559 B1 * | 7/2004 | Nakano et al. ................ 347/100 |
| 6,852,777 B1 | 2/2005 | Nakano et al. |
| 2002/0025994 A1 * | 2/2002 | Ishizuka et al. .............. 523/160 |
| 2002/0096085 A1 | 7/2002 | Gotoh et al. |
| 2003/0087988 A1 * | 5/2003 | Nakano et al. ............... 523/160 |
| 2003/0125415 A1 | 7/2003 | Nakano |
| 2003/0144378 A1 | 7/2003 | Mizushima et al. |
| 2004/0173120 A1 | 9/2004 | Tsuru et al. |
| 2005/0004262 A1 | 1/2005 | Azuma et al. |
| 2005/0174409 A1 * | 8/2005 | Taguchi ....................... 347/100 |

FOREIGN PATENT DOCUMENTS

| | | |
|---|---|---|
| JP | 61 036382 | 2/1986 |
| JP | 64-054084 | 3/1989 |
| JP | 08-003493 | 1/1996 |
| JP | 08-157761 | 6/1996 |
| JP | 10-298462 | 11/1998 |
| JP | 10-298467 | 11/1998 |
| JP | 2002-088291 | 3/2002 |
| JP | 2002-201428 | 7/2002 |
| JP | 2002-294108 | 10/2002 |
| JP | 2002-327138 | 11/2002 |
| JP | 2003-147236 | 5/2003 |
| JP | 2003-176428 | 6/2003 |
| JP | 2003-183553 | 7/2003 |
| JP | 2003-183554 | 7/2003 |
| JP | 2003206408 A * | 7/2003 |
| JP | 2004-002529 | 1/2004 |
| JP | 2004-002662 | 1/2004 |
| JP | 2004-075759 | 3/2004 |
| JP | 2004-285348 | 10/2004 |
| WO | WO 00/39226 | 7/2000 |
| WO | WO 03082994 A1 * | 10/2003 |

* cited by examiner

WATER-BASED INKS FOR INK-JET PRINTING

FIELD OF THE INVENTION

The present invention relates to water-based inks for ink-jet printing, water dispersions used in the water-based inks, prints printed with the water-based inks, and a process for producing the water dispersions.

Also, the present invention relates to ink sets for ink-jet printing and a process for producing prints using the ink sets.

BACKGROUND OF THE INVENTION

In ink-jet printing methods, droplets of ink are directly projected onto a recording medium from very fine nozzles and allowed to adhere to the recording medium to form characters and images. The ink-jet printing methods have been rapidly spread because of their various advantages such as easiness of full coloration, low costs, capability of using ordinary paper (plain paper, recycled paper) as the recording medium, non-contact with printed images and characters, etc.

Among such printing methods, in view of enhancing the weather resistance and water resistance of printed images and characters, an ink-jet printing method utilizing an ink containing a pigment as the colorant has now come to dominate (for example, refer to WO 00/39226, JP 8-157761A and JP 2003-183554A).

WO 00/39226 discloses a water-based ink containing a pigment-containing vinyl polymer.

JP 8-157761A discloses a water-based ink containing an oil film-forming component which is prepared by dissolving a water-insoluble resin therein in order to suppress color bleeding. However, since the water-insoluble resin must be dissolved in the ink, a content of the water-insoluble resin in the ink is small, so that the resultant ink fails to exhibit a sufficient function.

JP 2003-183554A discloses an ink containing 10 to 1000 ppm of a phthalic diester and a latex in order to form images having a good gloss. However, since a content of the phthalic diester in the ink is small, the resultant ink fails to exhibit a sufficient function.

JP 2004-75759A discloses a dispersion of colored fine particles containing a microcapsule formed by incorporating a hydrophobic pigment, a hydrophobic polymer and a high-boiling organic solvent in urethane particles.

JP 2003-147236A discloses a pigment-containing ink for ink-jet printing in which a total content of aliphatic acid derivatives in the ink is 1.0% by mass or lower, and the pigment particles are respectively coated with a water-insoluble polymer.

However, the pigment-containing ink is unsatisfactory in gloss, image clarity, etc.

SUMMARY OF THE INVENTION

The present invention relates to water-based inks exhibiting not only a sufficient optical density but also excellent gloss and image clarity; prints having excellent gloss and image clarity (inclusive of printed matters), and a process for producing water dispersions for ink-jet printing.

Thus, the present invention relates to the following aspects [1] to [4]:

[1] A water dispersion for ink-jet printing containing a water dispersion of particles of a vinyl polymer or a polyester-based polymer which contain a colorant (B); and a water-insoluble organic compound (A) except for aliphatic acid derivatives, as well as a water-based ink containing the water dispersion.

[2] A water-based ink for ink-jet printing containing a water dispersion of a pigment wherein a concentration of the pigment in the water-based ink is from 4 to 8% by weight, and when a solid image is printed on an ink-jet photographic paper at an ink size of 3 pl and a resolution of 1440 dpi×720 dpi and is irradiated with a laser from a direction perpendicular to a surface of the printed solid image, a correlation distance of amount of light reflected on the surface in a direction perpendicular to a printing direction is 4 μm or more.

[3] A print having characters or images printed with the above water-based ink using an ink-jet printer.

[4] A process for producing the above water dispersion for ink-jet printing, containing the following steps (1) to (3):

(1) preparing a mixture containing a water-insoluble polymer, an organic solvent, a colorant and water;

(2) dispersing the mixture obtained in the step (1); and (3) removing the organic solvent from a dispersion obtained in the step (2) to obtain a water dispersion containing particles of the water-insoluble polymer which contain the colorant, wherein a water-insoluble organic compound except for aliphatic acid derivatives is present during or after at least one of the steps (1) to (3).

Also, the present invention relates to an ink set for ink-jet printing which is capable of obtaining multi-order color or composite black images which exhibit a high optical density and are excellent in gloss and image clarity, as well as a process for producing a print by using the ink set.

That is, the present invention relates to the following aspects (1) to (4):

(1) An ink set for ink-jet printing containing two or more kinds of inks having different colors from each other, wherein the inks each contain a water dispersion of particles of a vinyl polymer or a polyester-based polymer which contain a colorant, and a water-insoluble organic compound (A) except for aliphatic acid derivatives.

(2) An ink set for ink-jet printing containing a magenta ink, a yellow ink and a cyan ink, wherein two of the three inks each contain a water dispersion of particles of a vinyl polymer or a polyester-based polymer which contain a colorant (B), and a water-insoluble organic compound (A) except for aliphatic acid derivatives, and a remaining one of the three inks contains no water-insoluble organic compound (A) except for aliphatic acid derivatives.

(3) A process for producing a print having composite black images or characters, containing the step of printing the images or characters with the inks of the ink set as defined in the above aspect (1) or (2) which contain a magenta ink, a yellow ink and a cyan ink, on an ink-jet photographic paper by an ink-jet printing method.

(4) A process for producing a print having multi-order color images or characters, containing the step of printing the images or characters with two or more kinds of inks having different colors from each other which are selected from the three inks of the ink set as defined in the above aspect (1) or (2), on an ink-jet photographic paper by an ink-jet printing method.

DETAILED DESCRIPTION OF THE INVENTION

Figure 1:
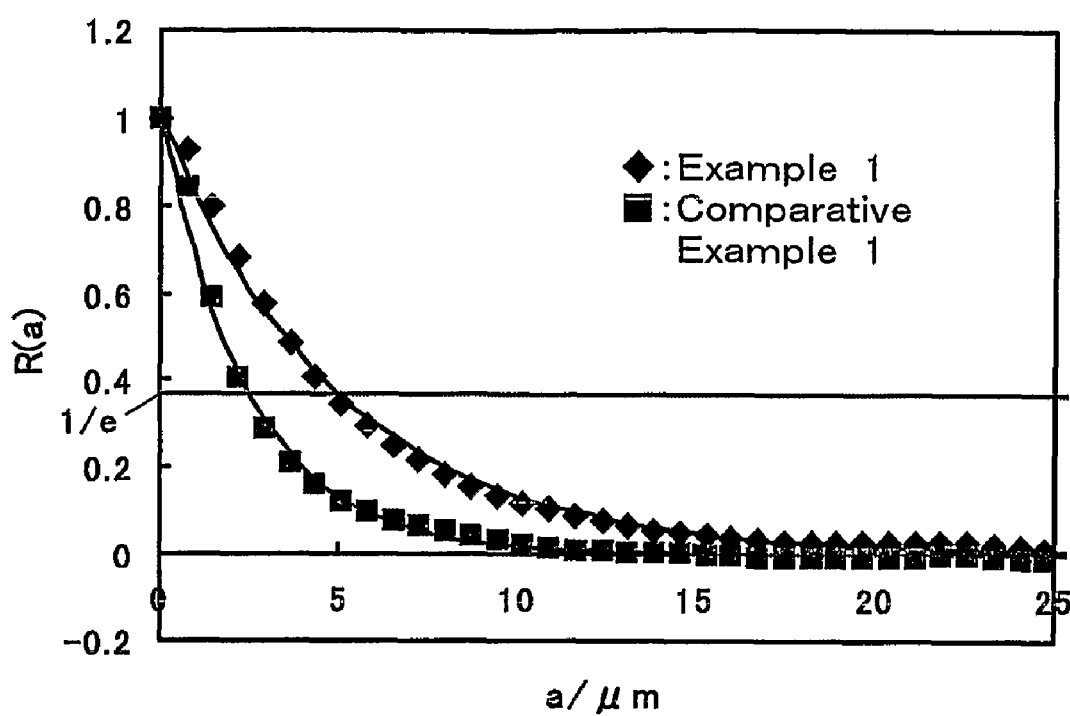
FIG. 1 is a view plotting an auto-correlation function R(a) of amount of light reflected on the print printed with the inks obtained in Example 1 and Comparative Example 1. The solid lines respectively represent results obtained by fitting with an exponential function: exp (–a/ξ) wherein ξ is a constant and means the correlation distance.

The water dispersion for ink-jet printing according to the present invention contains a water dispersion of particles of a vinyl polymer or a polyester-based polymer (hereinafter occasionally generally referred to merely as "polymer particles") which contain a colorant (B) (hereinafter occasionally referred to merely as a "colorant"), and a water-insoluble organic compound (A) except for aliphatic acid derivatives (hereinafter occasionally referred to merely as a "water-insoluble organic compound (A)"). In the following, the respective components of the water dispersion are successively explained.
(Water-Insoluble Organic Compound (A))

It is considered that at least a part of the water-insoluble organic compound (A) used in the present invention is, incorporated in the polymer particles to improve a flexibility of the polymer particles. Further, it is considered that the polymer particles which are thus improved in flexibility by incorporating a part of the water-insoluble organic compound (A) therein, are enhanced in fusibility therebetween when ejected from a nozzle of an ink-jet printer, and uniformly diffused over a recording paper, resulting in a smooth surface of the printed paper and, therefore, production of prints which are enhanced in gloss and image clarity.

The aliphatic acid derivatives fail to exhibit the above-mentioned effects and, therefore, are excluded from the scope of the water-insoluble organic compound (A) used in the present invention.

Here, the aliphatic acid derivatives which are excluded from the scope of the water-insoluble organic compound (A) include aliphatic acid monoester compounds produced from a monovalent aliphatic acid in the form of a saturated or unsaturated alkylcarboxylic acid and a monovalent alcohol, aliphatic acid amide compounds produced from the above aliphatic acid and ammonia or a lower amine having 3 or less carbon atoms, and aliphatic acid anhydrides derived from the above aliphatic acid.

More specifically, the aliphatic acid esters mean ester compounds produced from a saturated or unsaturated alkylcarboxylic acid having 8 to 22 carbon atoms, and an alcohol. Examples of the aliphatic acid esters include isotridecyl myristate, methyl stearate, methyl oleate, methyl palmitate and methyl behenate. Examples of the aliphatic acid amides include oleamide and stearamide. Examples of the aliphatic acid anhydrides include oleic anhydride. However, these compounds may be contained in the water dispersion of the present invention as long as the object of the present invention is not adversely affected.

The water-insoluble organic compound (A) preferably has a molecular weight of from 100 to 2,000 and more preferably from 100 to 1,000 in view of enhancing a gloss and an image clarity of the resultant ink.

The solubility of the water-insoluble organic compound (A) in water is 5 g or lower, preferably 3 g or lower and more preferably 1 g or lower per 100 g of water as measured at 20° C.

The water-insoluble organic compound (A) preferably has a Log P value of from –1 to 11, more preferably from 1 to 9, still more preferably from 1.5 to 8 and most preferably from 2 to 7 for enhancing a flexibility of the polymers.

In addition, in view of a good interrelation between the water-insoluble organic compound and the polymer particles, the value obtained by subtracting the Log P value of the vinyl polymer or the polyester-based polymer from the Log P value of the water-insoluble organic compound (A) is preferably from –4 to 8, more preferably from –2 to 6, still more preferably from –1.5 to 5 and most preferably from –1 to 4.

Here, the "Log P value" means a logarithm of a 1-octanol/water partition coefficient of the water-insoluble organic compound, and is expressed by a numerical value calculated according to fragment approach using SRC's LOGKNOW/KOWWIN Program of KowWin (Syracuso Research Corporation, USA) (The KowWin Program methodology is described in the following journal article: Meylan, W. M. and P. H. Howard, 1995, "Atom/fragment contribution method for estimating octanol-water partition coefficients", J. Parm. Sci., 84, pp. 83-92). The fragment approach is conducted on the basis of a chemical structure of compounds in which the number of atoms and the type of chemical bonds are taken into consideration. The Log P value is in general a numerical value which is used for relative evaluation of hydrophobic property of organic compounds, and the Log P value of polymers is determined by the below-mentioned calculation method.

The water-insoluble organic compound is preferably in the form of an ester compound, an ether compound or a sulfonamide compound for facilitating inclusion of the water-insoluble organic compound in the polymer particles. The water-insoluble organic compound is more preferably an ester or ether compound (f) containing two or more ester or ether bonds in a molecule thereof, and/or an ester or ether compound (g) containing one or more ester or ether bond and at least one functional group selected from the group consisting of a carboxyl group, a sulfonic group, a phosphoric acid residue, a carbonyl group, an epoxy group and a hydroxyl group in a molecule thereof. The number of the ester or ether bonds in the compound (f) is preferably from 2 to 3; the number of the ester or ether bonds in the compound (g) is preferably from 1 to 3, and the number of the functional groups in the compound (g) is preferably from 1 to 3. Meanwhile, the phosphoric acid residue means a phosphoric group as a remaining part of a phosphoric acid ester or ether which is obtained by excluding the esterified or etherified moiety therefrom.

Among these ester or ether compounds, preferred are esters produced from a monovalent carboxylic acid or a salt thereof, and a polyvalent alcohol; esters produced from a polyvalent acid such as polycarboxylic acid and phosphoric acid or a salt thereof, and a monovalent alcohol; and ethers of polyvalent alcohols, and more preferred are those compounds having two aliphatic or aromatic carboxylic ester groups or three phosphoric ester groups. Examples of the salt include alkali metal salts, alkanol amine salts and ammonium salts.

Examples of the monovalent carboxylic acid include linear or branched aliphatic carboxylic acids having 1 to 18 carbon atoms and preferably 2 to 10 carbon atoms, for example, linear aliphatic carboxylic acids such as acetic acid, butyric acid, caproic acid, caprylic acid, capric acid, lauric acid and palmitic acid, branched aliphatic carboxylic acids such as pivalic acid, and unsaturated aliphatic carboxylic acids such as acrylic acid and methacrylic acid; and aromatic carboxylic acids having 6 to 12 carbon atoms such as benzoic acid. Examples of the polyvalent acid include aliphatic carboxylic acids having 2 to 12 carbon atoms such as maleic acid, fumaric acid, itaconic acid, succinic acid, adipic acid and sebacic acid; aromatic carboxylic acids having 6 to 12 carbon atoms such as phthalic acid and trimellitic acid; and phosphoric acids.

Examples of the monovalent alcohol include linear or branched aliphatic alcohols having 1 to 18 carbon atoms and preferably 2 to 10 carbon atoms such as ethyl alcohol, butyl alcohol, hexyl alcohol, octyl alcohol, decyl alcohol and dodecyl alcohol; and aromatic alcohols having 6 to 12 carbon atoms such as phenol. Examples of the polyvalent alcohol include those having 2 to 12 carbon atoms such as ethylene glycol, diethylene glycol, neopentyl glycol, trimethylol propane, pentaerythritol and glycerol. The aliphatic acids and alcohols used in the present invention may be either saturated or unsaturated.

Specific examples of the water-insoluble organic compound include (1) aliphatic carboxylic esters, (2) aromatic carboxylic esters, (3) phosphoric esters, (4) cycloalkane (cycloalkene) carboxylic esters, (5) oxyacid esters, (6) glycol esters, (7) epoxy-based esters, (8) sulfonamides, (9) polyesters, (10) glyceryl alkyl ethers, (11) glyceryl alkyl esters, (12) glycol alkyl ethers, (13) glycol alkyl esters, (14) ethers or esters of trimethylol propane, and (15) ethers or esters of pentaerythritol.

Among these compounds, in view of a good gloss and a good image clarity of the resultant ink, preferred are the compounds (1) to (3), (5), (8) and (10), more preferred is at least one compound selected from the group consisting of (1) aliphatic di- or tri-carboxylic esters, (2) aromatic carboxylic esters and (3) phosphoric esters, and most preferred is at least one compound selected from the group consisting of (1) aliphatic dicarboxylic esters, (2) aromatic di- or tricarboxylic esters and (3) phosphoric esters.

The aliphatic dicarboxylic esters (1) are preferably compounds represented by the following general formula (1):

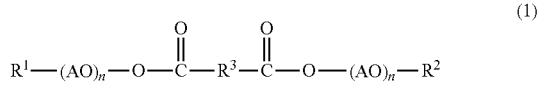

(1)

wherein $R^1$ and $R^2$ are respectively a hydrogen atom, a linear, branched or cyclic hydrocarbon group having 1 to 18 carbon atoms, an aralkyl group having 7 to 22 carbon atoms, an aryl group having 6 to 22 carbon atoms or a glycol ether group having 2 to 10 carbon atoms, and $R^1$ and $R^2$ may be the same or different; $R^3$ is a divalent aliphatic hydrocarbon group having 1 to 18 carbon atoms which may have an unsaturated group; $R^1$ to $R^3$ may have a substituent group; n represents an average molar number of addition; and AO is an alkyleneoxy group.

$R^1$ and $R^2$ are preferably a linear or branched alkyl or alkenyl group having preferably 2 to 18 carbon atoms and more preferably 4 to 12 carbon atoms in view of enhancing a gloss and an image clarity of the resultant prints. Specific examples of the alkyl or alkenyl group include methyl, ethyl, propyl, isopropyl, butyl, hexyl, 2-ethylhexyl, octyl, dodecyl and cetyl. The definitions of $R^1$ and $R^2$ are similarly applied to the below-mentioned formulae.

$R^3$ is preferably an alkylene group or an alkenylene group. Specific examples of the alkylene group or the alkenylene group include an ethylene group, a propylene group, a trimethylene group, a butylene group, a hexylene group, a 2-ethylhexylene group, an octylene group and a dodecylene group. Among these alkylene or alkenylene groups, preferred are alkylene groups having 2 to 15 carbon atoms, more preferred are alkylene groups having 2 to 12 carbon atoms, and most preferred are alkylene groups having 2 to 8 carbon atoms. The definition of $R^3$ is similarly applied to the below-mentioned formulae.

The symbol n is preferably a number of from 0 to 15, more preferably from 0 to 12 and most preferably from 2 to 10.

AO is an alkyleneoxy group having 2 to 4 carbon atoms such as an ethyleneoxy (EO) group, a propyleneoxy (PO) group and a butyleneoxy (BO) group, and when n is 2 or more, a plurality of AO groups may be the same or different. When a plurality of AO groups are different from each other, the respective AO groups may be either block-added or random-added.

Examples of the substituent group which may be bonded to $R^1$ to $R^3$ include a halogen atom such as fluorine, chlorine and bromine; an alkyl group having 1 to 12 carbon atoms such as methyl, ethyl, propyl, isopropyl, isobutyl, t-butyl, hexyl and lauryl; a cycloalkyl group such as cyclohexyl; an aryl group such as phenyl; an alkoxy group having 1 to 12 carbon atoms such as methoxy, ethoxy and isopropoxy; an aryloxy group such as phenyloxy; an alkoxycarbonyl group such as methoxycarbonyl; an acyl group such as acetyl and benzoyl; an acyloxy group such as acetyloxy; a cyano group; a nitro group; a hydroxyl group; a carboxyl group; an oxo group; an epoxy group; an ether group and an ester group. These substituent groups may be bonded to $R^1$ to $R^3$ alone or in combination of any two or more thereof.

Specific examples of the aliphatic dicarboxylic ester (1) include aliphatic dibasic acid esters such as dimethyl adipate, diethyl adipate, dibutyl adipate, diisobutyl adipate, bis(2-ethylhexyl)adipate, diisononyl adipate, diisodecyl adipate, bis(butyl diethylene glycol)adipate, dimethyl sebacate, diethyl sebacate, dibutyl sebacate, bis(2-ethylhexyl)sebacate, diethyl succinate and bis(2-ethylhexyl)azelate. Among these esters, especially preferred are diesters of aliphatic dibasic acids having 6 to 10 carbon atoms such as diethyl adipate, dibutyl adipate, diisobutyl adipate, bis(butyl diethylene glycol)adipate, bis(octoxy polyethylene glycol)adipate ($R^1$ and $R^2$ are both 2-ethylhexyl; AO=EO; average molar number of addition n: 4, 6 or 8), diethyl sebacate, dibutyl sebacate and diisobutyl sebacate. Examples of the aliphatic tricarboxylic ester include citric acid.

The aromatic carboxylic esters (2) are preferably di- or tri-carboxylic esters represented by the following general formula (2):

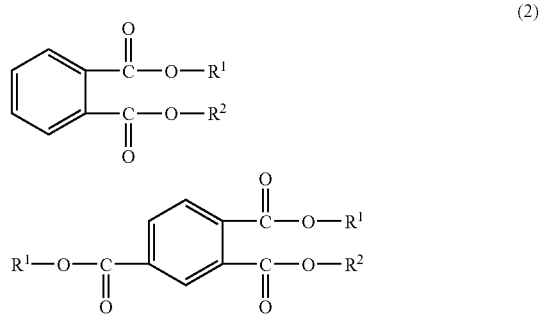

(2)

wherein $R^1$ and $R^2$ have the same meaning as defined above, and $R^1$ and $R^2$ may be the same or different.

Specific examples of the aromatic carboxylic esters (2) include phthalic esters such as dimethyl phthalate, diethyl phthalate, dibutyl phthalate, diisobutyl phthalate, bis(2-ethylhexyl)phthalate, di-n-octyl phthalate, diisodecyl phthalate, butylbenzyl phthalate, octylbenzyl phthalate, nonylbenzyl phthalate, stearylbenzyl phthalate, octyldecyl phthalate, dicylcohexyl phthalate, diphenyl phthalate, bis(dimethylcyclohexyl)phthalate, bis(t-butylcyclohexyl)phthalate and ethylphthalylethyl glycolate; and trimellitic esters such as dibutyl trimellitate, diisobutyl trimellitate and tris(2-ethylhexyl) trimellitate. Among these aromatic carboxylic esters, preferred are phthalic diesters containing an aliphatic alcohol residue having 1 to 5 carbon atoms such as dimethyl phthalate, diethyl phthalate, dibutyl phthalate and diisobutyl phthalate; benzyl phthalates containing an alkyl group having 3 to 18 carbon atoms such as octylbenzyl phthalate, nonylbenzyl phthalate and stearylbenzyl phthalate; and trimellitic diesters containing an aliphatic alcohol residue having 3 to 5 carbon atoms such as dibutyl trimellitate and diisobutyl trimellitate. The aromatic carboxylic esters are preferably in the form of an aromatic di- or tricarboxylic ester.

The phosphoric esters (3) are preferably compounds represented by the following general formula (3):

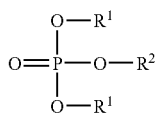

(3)

wherein $R^1$ and $R^2$ have the same meaning as defined above, and $R^1$ and $R^2$ may be the same or different.

Specific examples of the phosphoric esters (3) include tributyl phosphate, tris(2-ethylhexyl)phosphate, tris(butoxyethyl)phosphate, triphenyl phosphate, tricresyl phosphate, trixylenyl phosphate, cresyldiphenyl phosphate and 2-ethylhexyl diphenyl phosphate. Among these phosphoric esters, preferred are phosphoric esters containing an alkoxyalkyl group having 5 to 9 carbon atoms such as tris(butoxyethyl) phosphate; phosphoric esters containing an aliphatic hydrocarbon group having 4 to 12 carbon atoms such as tributyl phosphate; and phosphoric esters containing an aromatic hydrocarbon group having 7 to 12 carbon atoms such as tris(butoxyethyl)phosphate, tricresyl phosphate, trixylenyl phosphate and cresylphenyl phosphate. The phosphoric esters are preferably in the form of a phosphoric di- or triester.

The cycloalkane(cycloalkene)carboxylic esters (4) are those esters containing a cyclic hydrocarbon group having 3 to 8 carbon atoms which may have one unsaturated group, and are preferably cyclohexane (cyclohexene) dicarboxylic esters represented by the following general formula (4):

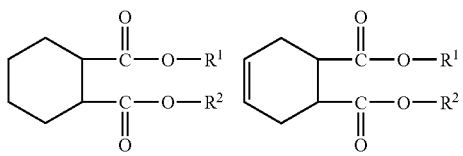

(4)

wherein $R^1$ and $R^2$ have the same meaning as defined above, and $R^1$ and $R^2$ may be the same or different.

Specific examples of the cycloalkane(cycloalkene)carboxylic esters (4) include cyclohexane esters such as dibutyl 1,2-cyclohexanedicarboxylate and diisononyl 1,2-cyclohexanedicarboxylate; and cyclohexene esters such as dibutyl 3,4-cyclohexenedicarboxylate and diisononyl 3,4-cyclohexenedicarboxylate.

The oxyacid esters (5) are preferably compounds represented by the following general formula (5):

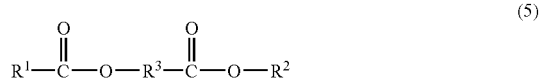

(5)

wherein $R^1$, $R^2$ and $R^3$ have the same meaning as defined above, and $R^1$ and $R^2$ may be the same or different.

Specific examples of the oxyacid esters (5) include triethyl acetylcitrate, tributyl acetylcitrate and methyl acetylricinoleate.

The glycol esters (6) are preferably compounds represented by the following general formula (6):

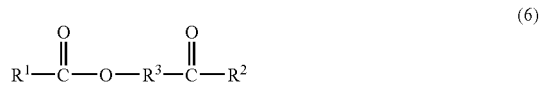

(6)

wherein $R^1$, $R^2$ and $R^3$ have the same meaning as defined above, and $R^1$ and $R^2$ may be the same or different.

Specific examples of the glycol esters (6) include diethylene glycol dibenzoate and triethylene glycol di(2-ethyl hexoate).

The epoxy-based esters (7) are preferably compounds represented by the following general formula (7):

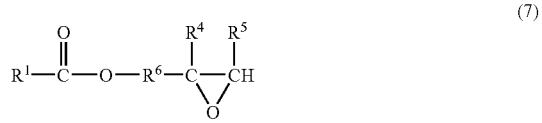

(7)

wherein $R^1$ has the same meaning as defined above, and $R^4$ and $R^5$ are each independently a hydrogen atom or a lower alkyl group having 1 to 5 carbon atoms; and $R^6$ is an alkylene group having 1 to 6 carbon atoms.

Specific examples of the epoxy-based esters (7) include butyl epoxystearate and octyl epoxystearate.

The sulfonamides (8) are preferably compounds represented by the following general formula (8):

$$R^1\text{—}SO_2NH\text{—}R^2 \qquad (8)$$

wherein $R^1$ and $R^2$ have the same meaning as defined above, and $R^1$ and $R^2$ may be the same or different.

Specific examples of the sulfonamides (8) include o- and p-toluene sulfonamides and N-butylbenzene sulfonamide.

The polyesters (9) are preferably compounds represented by the following general formula (9):

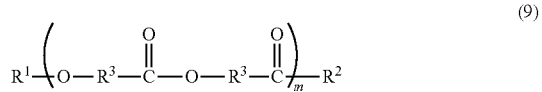

(9)

wherein $R^1$, $R^2$ and $R^3$ have the same meaning as defined above, and $R^1$ and $R^2$ as well as a plurality of $R^3$ groups may be respectively the same or different; m is a number from 1 to 18 and preferably from 1 to 10.

Specific examples of the polyesters (9) include poly(1,2-butanediol adipate) and poly(1,3-butanediol adipate).

Specific examples of the glyceryl alkyl ethers (10) include glyceryl monoethers, glyceryl diethers and glyceryl triethers. Among these glyceryl alkyl ethers, preferred are glyceryl monoethers containing a linear or branched alkyl group having 8 to 30 carbon atoms. The alkyl group have 8 to 30 carbon atoms, preferably 8 to 22 carbon atoms and more preferably 8 to 14 carbon atoms.

Examples of the alkyl group include 2-ethylhexyl, (iso) octyl, (iso)decyl, (iso)dodecyl, (iso)myristyl, (iso)cetyl, (iso) stearyl and (iso)behenyl.

The bonding position of the alkyl group in the glyceryl alkyl ethers is not particularly limited, and the glyceryl alkyl ethers may be in the form of a 1-alkyl glyceryl monoether or a 2-alkyl glyceryl monoether.

Specific examples of the glyceryl alkyl esters (11) include glyceryl monoalkyl esters, glyceryl dialkyl esters and glyceryl trialkyl esters.

Among these glyceryl alkyl esters, preferred are glyceryl alkyl esters of linear or branched aliphatic carboxylic acids having 1 to 18 carbon atoms and preferably 2 to 10 carbon atoms, for example, linear aliphatic carboxylic acids such as acetic acid, butyric acid, caproic acid, caprylic acid, capric acid, lauric acid and palmitic acid, and branched aliphatic carboxylic acids such as pivalic acid. The total number of carbon atoms in the alkyl groups is preferably 6 or more and more preferably 8 or more.

Further specific examples of the glyceryl alkyl esters (11) include glyceryl triacetate, glyceryl diacetate and glyceryl monoacetate.

Specific examples of the glycol alkyl ethers (12) include glycol monoalkyl ethers and glycol dialkyl ethers.

Specific examples of the glycol alkyl esters (13) include glycol monoalkyl esters and glycol dialkyl esters.

Examples of the glycol contained in the compounds (12) and (13) include ethylene glycol and neopentyl glycol. Examples of the alkyl group contained in the compounds (12) and (13) include a linear or branched alkyl group having 1 to 22 carbon atoms. The total number of carbon atoms in the alkyl groups is preferably 6 or more and more preferably 8 or more.

The above water-insoluble organic compounds (1) to (15) may be used alone or in the form of a mixture of any two or more thereof.

(Polymer Particles)

In the present invention, the polymer particles of the vinyl polymer or the polyester-based polymer are used for enhancing a optical density, a gloss and an image clarity by interaction with the water-insoluble organic compound.

The polymers of the polymer particles are preferably water-insoluble polymers for facilitating inclusion of the water-insoluble organic compound therein. Here, the "water-insoluble polymers" mean polymers exhibiting a solubility in water of 10 g or lower, preferably 5 g or lower and more preferably 1 g or lower when the polymers are dried at 105° C. for 2 h, and then dissolved in 100 g of water at 25° C. In the case where the polymers have a salt-forming group, the solubility means a solubility of the polymers whose salt-forming groups are neutralized completely (i.e., 100%) with acetic acid or sodium hydroxide according to kinds of the salt-forming groups.

The Log P value of the polymer is calculated by the following method.

1. The Log P value of the respective monomers from which the constitutional units of the polymer are derived, is calculated according to SRC's LOGKOW/KOWWIN Program. Meanwhile, the constitutional units of the polymer which are derived from chain transfer agents and initiators are excluded from the above calculation.

2. The thus obtained Log P value of the respective monomers is multiplied by a molar ratio (M) of the constitutional units derived from the monomers in the polymer chain, thereby obtaining a value [Log P×M] of the respective monomers.

3. The Log P value of the polymer is calculated as a sum of the [Log P×M] values of all the monomers obtained in the above step (2).

Meanwhile, in the case of salt-forming group-containing monomers, the above calculation is made as to the monomers before neutralizing salt-forming groups thereof.

The polymer particles are preferably vinyl polymer particles obtained by addition-polymerizing vinyl monomers such as vinyl compounds, vinylidene compounds and vinylene compounds in view of a good dispersion stability thereof.

(Vinyl Polymer)

The vinyl polymer used in the present invention is preferably a water-insoluble vinyl polymer which is produced by copolymerizing a monomer mixture containing (a) a salt-forming group-containing monomer (hereinafter occasionally referred to merely as a "component (a)"), and (b) a macromer (hereinafter occasionally referred to merely as a "component (b)") and/or (c) a hydrophobic monomer (hereinafter occasionally referred to merely as a "component (c)"). The water-insoluble vinyl polymer contains a constitutional unit derived from the component (a), and a constitutional unit derived from the component (b) and/or a constitutional unit derived from the component (c).

The salt-forming group-containing monomer (a) is used for enhancing a dispersion stability of the resultant water dispersion. Examples of the salt-forming group include a carboxyl group, a sulfonic group, a phosphoric group, an amino group and an ammonium group.

The salt-forming group-containing monomers are cationic monomers and anionic monomers. Examples of the salt-forming group-containing monomers include those described on page 5, from column 7, line 24 to column 8, line 29 of JP 9-286939A.

Typical examples of the cationic monomers include unsaturated amine-containing monomers and unsaturated ammonium salt-containing monomers. Among these cationic monomers, preferred are N,N-dimethylaminoethyl (meth) acrylate, N-(N',N'-dimethylaminopropyl)(meth)acrylate and vinyl pyrrolidone.

Typical examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconic ester. Examples of the unsaturated phosphoric acid monomers include vinylphosphonic acid, vinyl phosphate, bis(meth-acryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good dispersion stability and a good ejecting stability of the resultant inks, preferred are the unsaturated carboxylic acid monomers, and more preferred are acrylic acid and methacrylic acid.

The macromer (b) is used for enhancing a dispersion stability of the polymer particles, in particular, when the polymer particles contain a colorant.

The macromer (b) is in the form of a monomer containing a polymerizable unsaturated group which has a number-average molecular weight of 500 to 100,000 and preferably 1,000 to 10,000. Meanwhile, the number-average molecular weight of the macromer (b) may be measured by gel chromatography using chloroform containing 1 mmol/L of dodecyl dimethylamine as a solvent and using polystyrene as a standard substance.

Among these macromers (b), in view of a good dispersion stability of the polymer particles, preferred are styrene-based macromers and aromatic group-containing (meth)acrylate-based macromers which have a polymerizable functional group at one terminal end thereof.

Examples of the styrene-based macromers include homopolymers of styrene-based monomers, and copolymers of the styrene-based monomers with other monomers. Examples of the styrene-based monomers include styrene, 2-methyl styrene, vinyl toluene, ethylvinyl benzene, vinyl naphthalene and chlorostyrene.

As the aromatic group-containing (meth)acrylate-based macromers, there are preferably used homopolymers of an aromatic group-containing (meth)acrylate and copolymers of the aromatic group-containing (meth)acrylate with other monomers. Examples of the aromatic group-containing (meth)acrylate include (meth)acrylates containing an arylalkyl group having 7 to 22 carbon atoms, preferably 7 to 18 carbon atoms and more preferably 7 to 12 carbon atoms which may have a substituent group containing a hetero atom, and an aryl group having 6 to 22 carbon atoms, preferably 6 to 18 carbon atoms and more preferably 6 to 12 carbon atoms which may have a substituent group containing a hetero atom. Examples of the substituent group containing a hetero atom include a halogen atom, an ester group, an ether group and a hydroxyl group. Examples of the aromatic group-containing (meth)acrylate include benzyl(meth)acrylate, phenoxyethyl (meth)acrylate, 2-hydroxy-3-phenoxypropyl acrylate and 2-methacryloyloxyethyl-2-hydroxypropyl phthalate. Among these aromatic group-containing (meth)acrylates, preferred is benzyl(meth)acrylate.

The polymerizable functional group bonded to one terminal end of these macromers is preferably an acryloyloxy group or a methacryloyloxy group. Examples of the other monomers copolymerizable with the aromatic group-containing (meth)acrylate include acrylonitrile.

The content of the constitutional unit derived from the styrene-based monomer in the styrene-based macromer or the constitutional unit derived from the aromatic group-containing (meth)acrylate in the aromatic group-containing (meth) acrylate-based macromer is preferably 50% by weight or more and more preferably 70% by weight or more in view of enhancing an affinity to pigments.

The macromer (b) may further contain side chains composed of other constitutional units derived from an organopolysiloxane, etc. Such a side chain may be produced, for example, by copolymerizing with the macromer, a silicone-based macromer having a polymerizable functional group at one terminal end thereof which is represented by the following formula (10):

$$CH_2=C(CH_3)-COOC_3H_6-[Si(CH_3)_2-O]_t-Si(CH_3)_3 \quad (10)$$

wherein t is a number from 8 to 40.

The styrene-based macromer as the component (b) is commercially available, for example, from Toagosei Co., Ltd., as product names of AS-6(S), AN-6(S), HS-6(S), etc.

The hydrophobic monomer (c) is used for enhancing an optical density, a gloss and an image clarity of the resultant ink. Examples of the hydrophobic monomer include alkyl (meth)acrylates and aromatic group-containing monomers.

The preferred alkyl(meth)acrylates are those containing an alkyl group having 1 to 22 carbon atoms and preferably 6 to 18 carbon atoms. Examples of the alkyl(meth)acrylates include methyl(meth)acrylate, ethyl(meth)acrylate, (iso)propyl(meth)acrylate, (iso- or tertiary-)butyl (meth)acrylate, (iso)amyl (meth)acrylate, cyclohexyl(meth)acrylate, 2-ethylhexyl(meth)acrylate, (iso)octyl(meth)acrylate, (iso)decyl (meth)acrylate, (iso)dodecyl(meth)acrylate and (iso)stearyl (meth)acrylate.

Meanwhile, the terms "(iso- or tertiary-)" and "(iso)" used herein mean both the structure in which the groups expressed by "iso" and "tertiary" are present, and the structure in which these groups are not present (i.e., normal). and the "(meth) acrylate" means acrylate, methacrylate or both thereof.

The aromatic group-containing monomer may contain a substituent group having a hetero atom, and is preferably a vinyl monomer containing an aromatic group having 6 to 22 carbon atoms, preferably 6 to 18 carbon atoms and more preferably 6 to 12 carbon atoms. Examples of the aromatic group-containing monomer include the above styrene-based monomer (component c-1), and the above aromatic group-containing (meth)acrylate (component c-2). Examples of the substituent group having a hetero atom include those exemplified previously.

Among these components (c), in view of enhancing a gloss and a optical density, preferred is the styrene-based monomer (c-1). Examples of the styrene-based monomer (c-1) include those exemplified previously. Among these styrene-based monomers, especially preferred are styrene and 2-methyl styrene. The content of the component (c-1) in the component (c) is preferably from 10 to 100% by weight and more preferably from 20 to 80% by weight in view of enhancing a optical density and a gloss.

Also, examples of the aromatic group-containing (meth) acrylate as the component (c-2) include those exemplified previously. Among these aromatic group-containing (meth) acrylates, preferred are benzyl(meth)acrylate and phenoxyethyl(meth)acrylate. The content of the component (c-2) in the component (c) is preferably from 10 to 100% by weight and more preferably from 20 to 80% by weight in view of enhancing a gloss. Further, the components (c-1) and (c-2) are preferably used in combination with each other.

The monomer mixture may further contain (d) a hydroxyl-containing monomer (hereinafter occasionally referred to merely as a "component (d)"). The hydroxyl-containing monomer (d) exhibits an excellent effect of enhancing a dispersion stability of the polymer particles.

Examples of the component (d) include 2-hydroxyethyl (meth)acrylate, 3-hydroxypropyl(meth)acrylate, polyethylene glycol (n=2 to 30 wherein n represents an average molar number of addition of oxyalkylene groups: this definition is similarly applied to the following descriptions) (metli)acrylate, polypropylene glycol (n=2 to 30) (meth)acrylate, and poly(ethylene glycol (n=1 to 15)/propylene glycol (n=1 to 15) (meth)acrylate. Among these hydroxyl-containing monomers, preferred are 2-hydroxyethyl(meth)acrylate, polyethylene glycol mono-methacrylate and polypropylene glycol methacrylate.

The monomer mixture may further contain (e) a monomer (hereinafter occasionally referred to merely as a "component (e)") represented by the following general formula (11):

$$CH_2=C(R^7)COO(R^8O)_pR^9 \qquad (11)$$

wherein $R^7$ is a hydrogen atom or a lower alkyl group having 1 to 5 carbon atoms; $R^8$ is a divalent hydrocarbon group having 1 to 30 carbon atoms which may contain a hetero atom; $R^9$ is a monovalent hydrocarbon group having 1 to 30 carbon atoms which may contain a hetero atom; and p represents an average molar number of addition of $R^8O$ groups, and is a number from 1 to 60 and preferably a number from 1 to 30.

The component (e) exhibits an excellent effect of enhancing a optical density, a gloss and an image clarity of the resultant ink.

Examples of the hetero atom contained in the general formula (11) include a nitrogen atom, an oxygen atom, a halogen atom and a sulfur atom.

Examples of the suitable $R^7$ group include methyl, ethyl and (iso)propyl.

Examples of the suitable $R^8O$ group include oxymethylene, oxy(iso)propylene, oxytetramethylene, oxyheptamethylene, oxyhexamethylene, and an oxyalkylene group having 2 to 7 carbon atoms which is constituted from combination of at least two of these oxyalkylene groups.

Examples of the suitable $R^9$ group include an aliphatic alkyl group having 1 to 30 carbon atoms and preferably 1 to 20 carbon atoms, an aromatic ring-containing alkyl group having 7 to 30 carbon atoms, and a hetero ring-containing alkyl group having 4 to 30 carbon atoms.

Specific examples of the component (e) include methoxy polyethylene glycol (p in the general formula (11): 1 to 30; this definition is similarly applied to the following compounds) (meth)acrylate, methoxy polytetramethylene glycol (p=1 to 30) (meth)acrylate, ethoxy polyethylene glycol (p=1 to 30) (meth)acrylate, octoxy polyethylene glycol (p=1 to 30) (meth)acrylate, polyethylene glycol (p=1 to 30) (meth)acrylate 2-ethylhexyl ether, (iso)propoxy polyethylene glycol (p=1 to 30) (meth)acrylate, butoxy polyethylene glycol (p=1 to 30) (meth)acrylate, methoxy polypropylene glycol (p=1 to 30) (meth)acrylate, and methoxy(ethylene glycol/propylene glycol copolymer) (p=1 to 30: among which the number of ethylene glycol constitutional units is 1 to 29) (meth)acrylate. Among these compounds, preferred are octoxy polyethylene glycol (p=1 to 30) (meth)acrylate and polyethylene glycol (p=1 to 30) (meth)acrylate 2-ethylhexyl ether.

Examples of the commercially available components (d) and (e) include polyfunctional acrylate monomers (NK esters) available from Shin-Nakamura Kagaku Co., Ltd., such as "M-40G", "M-90G" and "M-230G"; and BLEMMER Series available from NOF Corporation, such as "PE-90", "PE-200", "PE-350", "PME-100", "PME-200", "PME-400", "PME-1000", "PP-500", "PP-800", "PP-1000", "AP-150", "AP-400", "AP-550", "AP-800", "50PEP-300" and "50POEP-800B".

These components (a) to (e) are respectively used alone or in the form of a mixture of any two or more thereof.

Upon production of the water-insoluble vinyl polymer, the contents of the above components (a) to (e) in the monomer mixture (contents of non-neutralized components; this definition is similarly applied to the following descriptions) or the contents of constitutional units derived from the components (a) to (e) in the water-insoluble polymer are as follows.

The content of the component (a) is preferably from 2 to 40% by weight and more preferably from 2 to 30% by weight and still more preferably from 3 to 20% by weight in view of a good dispersion stability of the resultant water dispersion.

The content of the component (b) is preferably from 1 to 25% by weight and more preferably from 5 to 20% by weight, in particular, in view of enhancing an interaction with the colorant.

The content of the component (c) is preferably from 5 to 98% by weight and more preferably from 10 to 60% by weight in view of a good gloss and a good image clarity.

The content of the component (d) is preferably from 5 to 40% by weight and more preferably from 7 to 20% by weight in view of a good dispersion stability of the resultant water dispersion.

The content of the component (e) is preferably from 5 to 50% by weight and more preferably from 10 to 40% by weight in view of a good dispersion stability of the resultant water dispersion.

The total content of the components (a) and (d) in the monomer mixture is preferably from 6 to 60% by weight and more preferably from 10 to 50% by weight in view of a good dispersion stability of the resultant water dispersion. The total content of the components (a) and (e) in the monomer mixture is preferably from 6 to 75% by weight and more preferably from 13 to 50% by weight in view of a good dispersion stability of the resultant water dispersion. The total content of the components (a), (d) and (e) in the monomer mixture is preferably from 6 to 60% by weight and more preferably from 7 to 50% by weight in view of a good dispersion stability of the resultant water dispersion.

Also, the weight ratio of the component (a) to a sum of the components (b) and (c) is preferably from 0.01 to 1, more preferably from 0.02 to 0.67 and still more preferably from 0.03 to 0.50 in view of a good gloss and a good image clarity.

(Production of Vinyl Polymer)

The vinyl polymer used in the present invention may be produced by copolymerizing the monomer mixture by known methods such as bulk polymerization, solution polymerization, suspension polymerization and emulsion polymerization. Among these polymerization methods, preferred is the solution polymerization.

The solvent used in the solution polymerization method is preferably an organic polar solvent, although not limited thereto. The organic polar solvent miscible with water may be used in the form of a mixture with water. Examples of the organic polar solvents include aliphatic alcohols having from 1 to 3 carbon atoms such as methanol, ethanol and propanol; ketones such as acetone and methyl ethyl ketone; and esters such as ethyl acetate. Among these solvents, preferred are methanol, ethanol, acetone, methyl ethyl ketone and mixed solvents of at least one thereof with water.

The polymerization may be carried out in the presence of a conventionally known radical polymerization initiator, e.g., azo compounds such as 2,2'-azobisisobutyronitrile and 2,2'-azobis(2,4-dimethylvaleronitrile), and organic peroxides such as t-butyl peroxyoctoate and dibenzoyl oxide.

The amount of the radical polymerization initiator to be used is preferably from 0.001 to 5 mol and more preferably from 0.01 to 2 mol per 1 mol of the monomer mixture.

The polymerization may also be carried out in the presence of a conventionally known chain transfer agent, e.g., mercaptans such as octyl mercaptan and 2-mercapto ethanol, and thiuram disulfides.

The polymerization conditions of the monomer mixture vary depending upon the kinds of radical polymerization initiator, monomers, solvent, etc., to be used, and the polymerization is generally conducted at a temperature of preferably from 30 to 100° C. and more preferably from 50 to 80° C. for 1 to 20 h. Further, the polymerization is preferably conducted in an atmosphere of an inert gas such as nitrogen and argon.

After completion of the polymerization reaction, the polymer thus produced is isolated from the reaction solution by a known method such as reprecipitation and removal of solvent by distillation. The thus obtained polymer may be purified by repeated reprecipitation, membrane separation, chromatography, extraction, etc., for removing unreacted monomers, etc., therefrom.

The weight-average molecular weight of the polymer used in the present invention is preferably from 5,000 to 500,000, more preferably from 10,000 to 400,000 and still more preferably from 10,000 to 300,000 in view of a good dispersion stability of the colorant as well as a good water resistance and a good ejection property of the resultant ink.

Meanwhile, the weight-average molecular weight of the polymer may be measured by gel chromatography using dimethylforamide containing 60 mmol/L of phosphoric acid and 50 mmol/L of lithium bromide as a solvent and using polystyrene as a standard substance.

When the vinyl polymer used in the present invention contains a salt-forming group derived from the salt-forming group-containing monomer (a), the salt-forming group is neutralized with a neutralizing agent. As the neutralizing agent, acids or bases may be used according to the kind of the salt-forming group in the polymer. Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine, triethanolamine and tributylamine.

The degree of neutralization of the salt-forming group is preferably from 10 to 200%, more preferably from 20 to 150% and most preferably from 50 to 150%.

The degree of neutralization of the anionic salt-forming group is calculated according to the following formula:

[weight (g) of neutralizing agent)/equivalent of neutralizing agent]/[acid value of polymer (KOH mg/g)×weight (g) of polymer/(56×1000)]×100

The degree of neutralization of the cationic salt-forming group is calculated according to the following formula:

[weight (g) of neutralizing agent)/equivalent of neutralizing agent]/[amine value of polymer (HCl mg/g)×weight (g) of polymer/(36.5×1000)]×100

The acid value or amine value may be calculated from the respective constitutional units of the polymer, or may also be determined by the method of subjecting a solution prepared by dissolving the polymer in an appropriate solvent such as methyl ethyl ketone to titration.

(Polyester-Based Polymer)

In the present invention, the polyester-based polymer particles are preferably water-dispersible polyester-based polymer particles in view of a good dispersion stability of the polymer particles. The water-dispersible polyester-based polymer particles are more preferably self-dispersing polymer particles which are formed by introducing a hydrophilic group such as a carboxyl group into a polyester skeleton to allow the particles to be stably dispersed in water, and which may be then neutralized, if required.

The polyester may be produced by polycondensing an optional diol compound with an optional dicarboxylic acid compound. At this time, in order to attain a suitable ink-jet applicability, there may also be used mono-ol compounds, triol compounds, monocarboxylic acids, tricarboxylic acids, tetracarboxylic acids, etc.

The diol compound and the dicarboxylic acid compound may contain an optional functional group such as a hydrocarbon group, a carbonyl group, an ester group and an ether group which may have a ring structure having 1 to 22 carbon atoms.

Examples of the diol compound as a raw material of the polyester include ethylene glycol, triethylene glycol, tetraethylene glycol, polyethylene glycol, propylene glycol, dipropylene glycol, tripropylene glycol, polypropylene glycol, tetramethylene glycol, polytetramethylene glycol, bisphenol A and alkyleneoxide adducts thereof, hydrogenated bisphenol A and alkyleneoxide adducts thereof, cyclohexane dimethanol and alkyleneoxide adducts thereof, polyester diols, polyurethane diols, bishydroxymethyl propionic acid and bishydroxymethyl butyric acid. Among these diol compounds, preferred are diol compounds having 2 to 30 carbon atoms, and more preferred are diol compounds having 2 to 22 carbon atoms.

Examples of the dicarboxylic acid compound as a raw material of the polyester include adipic acid, sebacic acid, fumaric acid, maleic acid and anhydride thereof, phthalic acid and anhydride thereof, and trimellitic acid and anhydride thereof. Among these dicarboxylic acid compounds, preferred are dicarboxylic acid compounds and anhydrides thereof having 2 to 22 carbon atoms, and more preferred are dicarboxylic acid compounds and anhydrides thereof having 4 to 22 carbon atoms.

The molecular weight of the polyester is not particularly limited, and is preferably from 500 to 100,000, more preferably from 1,000 to 50,000 and most preferably from 2,000 to 30,000. The weight-average molecular weight of the polyester may be measured by the same method as described above. The polyester may be produced by ordinary methods.

(Colorant (B))

The colorant (B) is used to exhibit an effect of enhancing the gloss and image clarity as aimed by the present invention. The colorant (B) is not particularly limited, and there may be used any of pigment, hydrophobic dye, and water-soluble dye such as acid dye, reactive dye and direct dye. The colorant used in the present invention is preferably pigment or hydrophobic dye in view of a good water resistance, a good dispersion stability and a good rubbing resistance. Among these colorants, to meet the recent strong demand for a high weather resistance, preferred is the pigment.

The pigment or hydrophobic dye used in the water-based ink is required to be present in the form of stable fine particles using a surfactant or a polymer. In particular, in view of anti-bleeding property and water resistance, the pigment and/or hydrophobic dye is preferably included in the polymer particles.

The pigment may be either organic or inorganic. The organic or inorganic pigment may be used in combination with an extender pigment, if required.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the organic pigments include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include one or more pigments selected from the group consisting of commercially available products marketed under the tradenames C.I. Pigment Yellow, C.I. Pigment Red, C.I. Pigment Violet, C.I. Pigment Blue, C.I. Pigment Green, etc., with various product numbers.

Examples of the extender pigment include silica, calcium carbonate and talc.

The hydrophobic dyes are not particularly limited as long as they are capable of being included in the polymer particles. To allow the dye to efficiently become included in the polymer, the solubility of the hydrophobic dye is preferably 2 g/L or more and more preferably from 20 to 500 g/L as measured at 25° C. on the basis of the organic solvent used upon the production of the polymer, such as preferably methyl ethyl ketone.

Examples of the hydrophobic dyes include oil-soluble dyes and disperse dyes. Among these dyes, preferred are oil-soluble dyes.

Examples of the oil-soluble dyes include one or more dyes selected from the group consisting of commercially available products marketed from Orient Chemical Co., Ltd., BASF AG, etc., under the tradenames C.I. Solvent Black, C.I. Solvent Yellow, C.I. Solvent Red, C.I. Solvent Violet, C.I. Solvent Blue, C.I. Solvent Green, and C.I. Solvent Orange, etc., with various product numbers.

Examples of the disperse dyes include one or more dyes selected from the group consisting of commercially available products marketed under the tradenames C.I. Disperse Yellow, C.I. Disperse Orange, C.I. Disperse Red, C.I. Disperse Violet, C.I. Disperse Blue, C.I. Disperse Green, etc., with various product numbers. Among these dyes, preferred are C.I. Solvent Yellow 29 and 30 for yellow colorant, C.I. Solvent Blue 70 for cyan colorant, C.I. Solvent Red 18 and 49 for magenta colorant, and C.I. Solvent Black 3 and 7 and nigrosine black dyes for black colorant.

Among these colorants, to exhibit the effects of a gloss and an image clarity of the present invention, preferred is a chromatic colorant. Here, the term "chromatic color" means colors except for white, black and intermediate colors (halftone) between white and black.

The above colorants may be used alone or in the form of a mixture containing any two or more thereof at an optional mixing ratio.

(Water Dispersion/Water-Based Ink)

The contents of the respective components in the water dispersion and water-based ink of the present invention as well as weight ratios thereof are as follows.

In view of enhancing an image clarity and a gloss, the lower limit of the content of the water-insoluble organic compound (A) is preferably 0.11% by weight or more, more preferably 0.15% by weight or more, still more preferably 0.2% by weight or more and most preferably 0.5% by weight or more, and the upper limit is preferably 10% by weight or less, more preferably 5% by weight or less, still more preferably 3% by weight or less and most preferably 2% by weight or less. From these viewpoints, the content of the water-insoluble organic compound (A) is preferably from 0.11 to 10% by weight, more preferably from 0.15 to 5% by weight, still more preferably from 0.2 to 3% by weight and most preferably from 0.5 to 2% by weight.

In view of a good optical density, a good image clarity and a good gloss, the content of the polymer particles (solid content except for the water-insoluble organic compound and colorant: this definition is similarly applied to the following descriptions) is preferably from 0.5 to 30% by weight, more preferably from 1 to 20% by weight and most preferably from 1 to 15% by weight.

In view of a good optical density, the content of the colorant (B) is preferably from 1 to 30% by weight, more preferably from 2 to 25% by weight and most preferably from 2 to 20% by weight.

In view of enhancing a gloss and an image clarity, the weight ratio ((A)/the polymer particles) of the water-insoluble organic compound (A) to the polymer particles is preferably from 1/100 to 5/1, more preferably from 1/50 to 2:1, still more preferably from 1/50 to 1/1, further still more preferably from 1/30 to 1/1 and most preferably from 1/10 to 1/1.

In view of a good image clarity and a good gloss, the weight ratio ((A)/(B)) of the water-insoluble organic compound (A) to the colorant (B) is preferably from 1/40 to 5/1 and more preferably from 1/30 to 1/1.

In view of a good dispersion stability of the polymer particles, the weight ratio (the polymer particles /(B)) of the polymer particles to the colorant (B) is preferably from 5/95 to 90/10, more preferably from 10:90 to 75:25 and most preferably from 20/80 to 50/50.

The content of water in the water dispersion and the water-based ink of the present invention is preferably from 30 to 90% by weight and more preferably from 40 to 80% by weight. The water dispersion used herein means a dispersion prepared by dispersing a colorant in water as a main solvent, whereas the water-based ink used therein means an ink using water as a main solvent.

The surface tension of the water dispersion of the present invention is preferably from 30 to 65 mN/m and more preferably from 35 to 60 mN/m as measured at 20° C., whereas the surface tension of the water-based ink of the present invention is preferably from 20 to 35 mN/m and more preferably from 25 to 35 mN/m as measured at 25° C. in view of ensuring a good ejection of ink from nozzles.

The contact angle of the water-based ink which is ejected onto an ink-jet photographic paper through an ejection nozzle having an inner diameter of 30 μm and in an ejecting amount of 1 nL and then allowed to stand for 1 s, is preferably 15 to 60° and more preferably 25 to 50°. When the contact angle of the water-based ink lies in the above-specified range, a time sufficient to well control a penetrability of the ink into the recording medium and improve an affinity (fusibility) between the polymer particles in the water-based ink is ensured, and as a result, the resultant print is improved in gloss and image clarity. In general, the lower the surface tension of ink, the higher the penetrability of the ink into a recording medium. However, the contact angle of the water-based ink of the present invention can be controlled to the above suitable range owing to the water-insoluble organic compound contained therein.

The viscosity of a 10 wt % solution of the water dispersion is preferably from 2 to 6 mPa·s and more preferably from 2 to 5 mPa·s as measured at 20° C. to obtain a water-based ink having a suitable viscosity therefrom. The viscosity of the water-based ink is preferably from 2 to 12 mPa·s and more preferably from 2.5 to 10 mPa·s to ensure a good ejection property.

The process for producing the water dispersion for ink-jet printing according to the present invention is not particularly limited. For example, the water-insoluble organic compound (A) may be mixed with a water dispersion of the polymer particles while appropriately stirring to incorporate the compound into the polymer particles. A part of the water-insoluble organic compound (A) may be present outside of the polymer particles.

When a hydrophobic dye or a pigment is used as the colorant (B), the hydrophobic dye or pigment is preferably contained in the water-insoluble polymer particles in view of a good dispersion stability and a good rubbing property.

Such a water dispersion may be produced, for example, by the following steps (1) to (3):

(1) preparing a mixture containing a water-insoluble polymer, an organic solvent, a colorant and water as well as a neutralizing agent, if required;

(2) dispersing the mixture obtained in the step (1) to obtain a dispersion of the water-insoluble polymer particles containing the colorant; and (3) removing the organic solvent from the dispersion obtained in the step (2) to obtain a water dispersion containing the water-insoluble polymer particles containing the chromatic colorant.

In the step (1), first, preferably, the water-insoluble polymer is dissolved in the organic solvent, and then the colorant and water together with optional components such as neutralizing agent and surfactant, if required, are added to the thus obtained organic solvent solution under mixing to obtain a dispersion of an oil-in-water type. The content of the colorant in the dispersion is preferably from 5 to 50% by weight and more preferably from 10 to 40% by weight. The content of the organic solvent in the dispersion is preferably from 10 to 70% by weight and more preferably from 10 to 50% by weight. The content of the water-insoluble polymer in the dispersion is preferably from 2 to 40% by weight and more preferably from 3 to 20% by weight, and the content of water in the dispersion is preferably from 10 to 70% by weight and more preferably from 20 to 70% by weight.

When the water-insoluble polymer contains a salt-forming group, the neutralizing agent is preferably used in the dispersion. The degree of neutralization of the salt-forming group in the polymer is not particularly limited. In general, the degree of neutralization is preferably controlled such that the finally obtained water dispersion exhibits a neutral liquid property, for example, a pH of 4.5 to 10. The pH of the dispersion may also be determined from the desired degree of neutralization for the water-insoluble polymer. The neutralizing agent used in the present invention are those exemplified above. In addition, the water-insoluble polymer may be previously neutralized.

Examples of the organic solvents include alcohol solvents such as ethanol, isopropanol and isobutanol; ketone solvents such as acetone, methyl ethyl ketone and diethyl ketone; and ether solvents such as dibutyl ether, tetrahydrofuran and dioxane. Among these organic solvents, preferred are those having a solubility in water of from 10 to 50% by weight as measured at 20° C., and more preferred is methyl ethyl ketone.

The method for dispersing the mixture in the step (2) is not particularly limited. The polymer particles may be finely divided into fine particles having a desired average particle size only by substantial dispersion procedure. Preferably, the mixture is first subjected to preliminary dispersion procedure, and then to the substantial dispersion procedure by applying a shear stress thereto so as to control the average particle size of the polymer particles to a desired value. The dispersion procedure in the step (2) is preferably conducted at a temperature of from 5 to 50° C. and more preferably from 10 to 35° C.

Upon subjecting the mixture to the preliminary dispersion procedure, there may be used ordinary mixing or stirring devices such as anchor blades. Examples of the preferred mixing or stirring devices include high-speed mixers or stirrers such as "Ultra Disper" (tradename: available from Asada Tekko Co., Ltd., "Ebara Milder" (tradename: available from Ebara Seisakusho Co., Ltd.), "TK Homomixer", "TK Pipeline Mixer", "TK Homo Jetter", "TK Homomic Line Flow" and "Filmix" (tradenames: all available from Tokushu Kika Kogyo Co., Ltd.), "Clearmix" (tradename: available from M-Technic Co., Ltd.) and "K. D. Mill" (tradename: available from Kinetics Dispersion Inc.).

To apply the shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename: available from Izumi Food Machinery Co., Ltd.) and "Mini-Labo 8.3H Model" (tradename: available from Rannie Corp.), and chamber-type high-pressure homogenizers such as "Micro Fluidizer" (tradename: available from Microfluidics Inc.), "Nanomizer" (tradename: available from Nanomizer Co., Ltd.), "Altimizer" (tradename: available from Sugino Machine Co., Ltd.), "Genus PY" (tradename: available from Hakusui Kagaku Co., Ltd.) and "DeBEE 2000" (tradename: Nippon BEE Co., Ltd.). Among these apparatuses, in the case where the pigment is contained in the mixture, the high-pressure homogenizers are preferred in view of reducing a particle size of the pigment.

In the step (3), the organic solvent is removed from the thus obtained dispersion by known methods to obtain a water dispersion of the polymer particles containing the colorant. The organic solvent is substantially completely removed from the thus obtained water dispersion of the polymer particles. The content of the residual organic solvent in the resultant water dispersion is preferably 0.1% by weight or lower and more preferably 0.01% by weight or lower.

In the thus-obtained water dispersion of the polymer particles containing the colorant (B), solid components made of the polymer particles containing the colorant are dispersed in water as a main solvent. The configuration of the polymer particles is not particularly limited as long as the particles are formed from at least the colorant and the polymer. Examples of the configuration of the polymer particles include the particle configuration in which the colorant is enclosed in the respective polymer particles, the particle configuration in which the colorant is uniformly dispersed in the respective polymer particles, and the particle configuration in which the colorant is exposed onto a surface of the respective polymer particles.

The water dispersion for ink-jet printing according to the present invention may be produced by the process including the above steps (1) to (3) wherein the water-insoluble organic compound (A) is present during or after at least one of the steps (1) to (3).

For example, upon production of the mixture in the step (1), the water-insoluble organic compound, the water-insoluble polymer, the organic solvent, the colorant and water together with the neutralizing agent, if required, are mixed with each other. The content of the water-insoluble organic compound in the mixture is preferably from 1 to 40% by weight and more preferably from 1 to 20% by weight. The contents of the other components are the same as described previously. The temperature upon the mixing is preferably from about 5 to 50° C. The other conditions are the same as described in the steps (1) to (3) above, thereby obtaining the water dispersion of the present invention. Alternatively, a mixture containing the water-insoluble polymer, the organic solvent, the colorant and water together with the neutralizing agent, if required, may be mixed with the water-insoluble organic compound. In this case, the amount of the water-insoluble organic compound used is preferably from 1 to 40 parts by weight and more preferably from 1 to 20 parts by weight based on 100 parts by weight of the above mixture.

In the step (2), the water-insoluble organic compound may be added to or mixed in the mixture upon subjecting the mixture to dispersing treatment. The amount of the water-insoluble organic compound mixed is preferably from 1 to 40 parts by weight and more preferably from 1 to 20 parts by weight based on 100 parts by weight of the mixture. Alternatively, the dispersion obtained after subjecting the mixture to the dispersing treatment may be mixed with the water-insoluble organic compound. The mixing ratio between the dispersion and the water-insoluble organic compound is adjusted such that the water-insoluble organic compound is used in an amount of preferably from 1 to 40 parts by weight and more preferably from 1 to 20 parts by weight on the basis of 100 parts by weight of the dispersion. The temperature upon the mixing is preferably from about 5 to 50° C. The other conditions are the same as described in the above steps (1) to (3), thereby obtaining the water dispersion of the present invention.

In the step (3), although the water-insoluble organic compound (A) may be added to or mixed in the dispersion during removing the organic solvent from the dispersion, it is preferred that after the water dispersion of the polymer particles containing the colorant is produced in the step (3), the water-insoluble organic compound (A) is mixed with the thus obtained water dispersion.

The mixing ratio between the water dispersion of the polymer particles containing the colorant (B) and the water-insoluble organic compound (A) is adjusted such that the water-insoluble organic compound (A) is used in an amount of preferably from 1 to 100 parts by weight and more preferably from 3 to 50 parts by weight and still more preferably from 3 to 20 parts by weight on the basis of 100 parts by weight of solid components contained in the water dispersion of the polymer particles containing the colorant (B). Upon mixing, the water-insoluble organic compound (A) may be added to the water dispersion of the polymer particles containing the colorant (B), or vice versa. The mixing temperature is preferably from about 5 to 50° C.

Among the above production methods, especially preferred is the method in which the water-insoluble organic compound (A) is present in the water dispersion obtained in the step (3). More specifically, in the preferred method, the water-insoluble organic compound (A) is added to or mixed in the water dispersion of the polymer particles containing the colorant (B) which is obtained in the step (3).

The thus obtained water dispersion is a water dispersion of the water-insoluble polymer particles containing the water-insoluble organic compound (A) and the colorant (B).

The water dispersion of the polymer particles may be directly used as a water-based ink. Alternatively, various additives ordinarily used in water-based inks for ink-jet printing such as wetting agents, penetrants, dispersants, viscosity modifiers, defoaming agents, mildew-proof agents and anti-corrosion agents may be added to the water dispersion upon use.

The average particle size of the polymer particles dispersed in the water dispersion and the water-based ink is preferably from 0.01 to 0.5 μm, more preferably from 0.03 to 0.3 μm and still more preferably from 0.05 to 0.2 μm in view of preventing clogging of nozzles in a printer and enhancing the dispersion stability. Meanwhile, the average particle size may be measured using a laser particle analyzing system "ELS-8000" (cumulant analysis) available from Otsuka Denshi Co., Ltd. The measurement is conducted at a temperature of 25° C., an angle between incident light and detector of 90° and a cumulative frequency of 100 times, and a refractive index of water (1.333) is input to the analyzing system as a refractive index of the dispersing medium. The concentration of the water dispersion or the water-based ink to be measured is usually about $5 \times 10^{-3}$% by weight.

Meanwhile, even in the case where the polymer particles contain the water-insoluble organic compound (A) and/or the colorant (B), the average particle size of the polymer particles is preferably in the same range as described above.

(Water-Based Ink Having a Correlation Distance of 4 μm or More)

The present invention also relates to the water-based ink for ink-jet printing which contains a water dispersion of pigment wherein a concentration of the pigment in the water-based ink is from 4 to 8% by weight, and when a solid image is printed on an ink-jet photographic paper at an ink size of 3 pl and a resolution of 1440 dpi×720 dpi (100% duty solid printing) and is irradiated with a laser from a direction perpendicular to a surface of the printed solid image, a correlation distance of amount of light reflected on the printed surface in a direction perpendicular to a printing direction is 4 μm or more.

In the water dispersion of pigment, the pigment is preferably contained in the polymer particles. In addition, the water-insoluble organic compound is preferably contained in the water-based ink, and more preferably included in the polymer particles containing the pigment.

Meanwhile, the polymer particles, the water-insoluble organic compound and the pigment as well as quantitative relation between these components are the same as described previously.

The direction perpendicular to the printing direction means such a direction perpendicular to a moving direction of a printing head of an inkjet printer, i.e., is the same as the paper feeding direction. The "correlation distance of amount of light reflected on the surface of a printed image in the direction perpendicular to the printing direction when irradiated with a laser from a direction perpendicular to the printed surface" means a distance of shift in the direction perpendicular to the printing direction at which an auto-correlation function R(a) value calculated from a distribution of amount of light reflected on fine regions of the printed surface which is measured by irradiating a laser thereto from a direction perpendicular to the printed surface, namely from just above the surface of the printed image, by the following method, is equal to 1/e.

The method for calculation of the auto-correlation function R(a) is as follows.

First, the distribution of amount of light reflected on the surface of the printed image when irradiated with a laser from a direction perpendicular to the printed surface is measured. The amount of light reflected on a pixel disposed at the i-th position in the direction perpendicular to the printing direction (i.e., moving direction of the printing head) and the j-th position in the printing direction is expressed by Fij. Using a part of the thus obtained data of distribution of amount of light reflected, the auto-correlation function R(a) values in the direction perpendicular to the printing direction are determined according to the following formula.

The following formula used for determining the auto-correlation function R(a) is obtained by modifying the formula (11) described on page 32 of the literature "Technical Manual for Highly-Fine Color Digital Standard Image Data according to ISO/JIS-SCID JIS X9201-1995", Japanese Standards Association, 1995 so as to conform to the case where it is shifted by a distance (a) only in the direction perpendicular to the printing direction. In the following formula, the numerals of 256 and 640 on Σ are used as numbers of cumulative frequency which are sufficient to attain the data.

$$R(a) = R(k \cdot \Delta x) = \frac{\sum_{j=1}^{256}\sum_{i=1}^{640}(F_{ij} - \overline{F_0}) \cdot (F_{i+k,j} - \overline{F_k})}{\left[\left(\sum_{j=1}^{256}\sum_{i=1}^{640}(F_{ij} - \overline{F_0})^2\right) \cdot \left(\sum_{j=1}^{256}\sum_{i=1}^{640}(F_{i+k,j} - \overline{F_k})^2\right)\right]^{1/2}}$$

$$\text{Here, } \overline{F_k} = \frac{1}{640 \times 256}\sum_{j=1}^{256}\sum_{i=1}^{640}F_{i+k,j}$$

wherein a is a shift distance; $\Delta x$ is a length of one pixel; and k is the number of pixels shifted, and represents 0 or a positive integer.

The correlation distance (distance at which the auto-correlation function R(a) value is 1/e) is 4 μm or more and preferably 5 μm or more. The upper limit of the correlation distance is not particularly limited, and may be usually 20 μm or lower.

The distance at which the auto-correlation function R(a) value is regarded as zero (0) is required to be 2 to 3 times the correlation distance, and, therefore, means about 10 μm if the correlation distance is 4 μm. The distance corresponds to a radius (about 10 μm) of one dot of 3 pl ink ejected from a nozzle. The correlation distance of 4 μm or more means that the amount of light reflected has a correlation with that reflected even at a position located apart by about 10 μm therefrom. Therefore, this also means that a smooth surface is spread over a region equal to or more than the size of one dot. As a result, it is considered that even if dots are overlapped with each other upon printing, the resultant image is improved in gloss and image clarity.

Meanwhile, in a printer with a built-in MSDT (multi-size dot technology) function, the minimum ink size corresponds to the ink size used herein. If the ink size is 3 pl, the correlation distance can also be evaluated using the printer with the MSDT function.

When the concentration of the pigment in the water-based ink is too low, although the gloss and image clarity is enhanced, the optical density tends to be deteriorated. Therefore, in order to satisfy all of the optical density, gloss and image clarity, the content of the pigment in the water-based ink is preferably from 4 to 8% by weight and more preferably from 5 to 7% by weight.

The ink-jet photographic paper used in the present invention is such a void-type glossy recording medium whose surface has a 60° gloss of from 35 to 45. Here, the gloss is a value measured by a glossmeter "HANDY GLOSSMETER (tradename)" (product number: PG-1) available from Nippon Denshoku Industries Co., Ltd. Such a photographic paper has been already marketed, and suitable examples of the photographic paper include "KA450PSK" (tradename) available from Seiko Epson Co., Ltd.

(Ink Set)

The ink set for ink-jet printing according to the present invention is constituted of two or more kinds of inks having different colors (preferably chromatic colors) from each other. Here, the "different colors" mean colors which are not identical in a* (chromaticity in red-green direction) and b* (chromaticity in yellow-blue direction) to each other when colors of light reflected on a printed image which is irradiated with light having a wavelength of D65/2 are measured using a spectroscopic color difference meter "SE-2000" available from Nippon Denshoku Industries Co., Ltd., and expressed by L*a*b* color system. For example, the colors may be at least two chromatic colors selected from the group consisting of cyan, yellow, magenta, light cyan, dark yellow and light magenta.

The ink set of the present invention preferably includes combination of two or more kinds of inks having different colors from each other which are selected from these chromatic colors, and may be any of three-color ink set, four-color ink set, five-color ink set, six-color ink set and seven or more-color ink set.

The ink set more preferably includes two or more kinds of inks having different colors from each other which are selected from the group consisting of magenta ink, yellow ink and cyan ink as three primary colors of subtractive color mixture, and more preferably constituted of these three kinds of inks. Further, there are preferably used ink sets containing magenta ink, yellow ink and cyan ink of which two of the three inks contain a water dispersion of particles of a vinyl polymer or a polyester-based polymer which contain a colorant (B), and a water-insoluble organic compound (A) except for aliphatic acid derivatives, and the remaining one ink contains no water-insoluble organic compound (A) except for aliphatic acid derivatives. The ink set of the present invention may further include a black ink composed of self-dispersible carbon black, etc.

(Process for Production of Prints)

In the process for production of prints according to the present invention, images or characters are printed on an ink-jet photographic paper with two or more kinds of inks of the ink set which have different colors from each other by an ink-jet printing method to thereby produce multi-order color prints (also referred to as "printed matters").

For example, when the ink set includes magenta ink and yellow ink, prints with red color as a secondary color thereof can be printed. When the ink set includes yellow ink and cyan ink, prints with green color as a secondary color thereof can be printed. When the ink set includes magenta ink and cyan ink, prints with blue color as a secondary color thereof can be printed. Also, prints with tertiary color can be printed using three or more different kinds of colors, and further prints with multi-order color such as quaternary or higher-order color can be similarly printed.

The multi-order color prints may be produced by allowing dots of different color inks to be present either in an overlapped relation to each other or in parallel with each other. To exhibit the effects of the present invention, the dots of different color inks are preferably present in at least partially overlapped relation to each other.

In addition, when the ink set of the present invention is an chromatic color ink set including magenta ink, yellow ink and cyan ink, prints with composite black obtained by overlapping the magenta ink, yellow ink and cyan ink can be produced. In this case, the composite black printed on an ink-jet photographic paper has a 20° reflection gloss of 50 or more and preferably 70 or more to attain a good photographic image.

The ink-jet printing method using the water-based ink of the present invention is not particularly limited, and is suitably applied to piezoelectric-type ink-jet printers.

EXAMPLES

In the following production examples, examples and comparative examples, the "part(s)" and "%" indicate "part(s) by weight" and "% by weight", respectively, unless otherwise specified.

Production Examples 1 to 4

Production of Polymer

Twenty parts of methyl ethyl ketone and 0.03 part of a chain transfer agent (2-mercaptoethanol) together with 10% of 200 parts of respective monomers shown in Table 1 were charged into a reaction vessel and mixed with each other, and then the reaction vessel was fully purged with a nitrogen gas to thereby obtain a mixed solution.

Separately, remaining 90% of the monomers shown in Table 1 was charged into a dropping funnel, and further 0.27 part of the chain transfer agent, 60 parts of methyl ethyl ketone and 1.2 parts of a radical polymerization initiator (2,2'-azobis(2,4-dimethylvaleronitrile)) were added thereto and mixed with each other, and the dropping funnel was fully purged with a nitrogen gas to thereby obtain a mixed solution.

The mixed solution in the reaction vessel was heated to 65° C. under stirring in a nitrogen atmosphere, and then the mixed solution in the dropping funnel was gradually dropped thereinto over 3 h. After the elapse of 2 h from completion of the dropping while maintaining the temperature at 65° C., a solution prepared by dissolving 0.3 part by weight of the radical polymerization initiator in 5 parts of methyl ethyl ketone was added to the mixed solution, and the resultant reaction solution was further aged at 65° C. for 2 h and at 70° C. for 2 h to obtain a polymer solution.

The weight-average molecular weight of the thus obtained polymer was measured by the above gel chromatography. The results are shown in Table 1.

Meanwhile, details of the respective compounds shown in Table 1 are as follows.

(b) Styrene Macromer (Log P value: 165.72):
"AS-6(S)" (tradename) available from Toagosei Co., Ltd.; number-average molecular weight: 6000; polymerizable functional group: methacryloyloxy group (d) M-90G (Log P value: −0.89):
Polyethylene Glycol Monomethacrylate (average molar number of addition of ethyleneoxide: 9; end group: methyl; "NK-ESTER M-90G" (tradename) available from Shin-Nakamura Kagaku Co., Ltd.

(d) PP-500 (Log P value: 2.25):
Polypropylene Glycol Monomethacrylate (average molar number of addition of propyleneoxide: 9; end group: hydroxyl; "BLEMMER PP-500" (tradename) available from NOF Corporation.

(d) PP-800 (Log P value: 2.67):
Polypropylene Glycol Monomethacrylate (average molar number of addition of propyleneoxide: 12; end group: hydroxyl; "BLEMMER PP-800" (tradename) available from NOF Corporation.

(d) 50POEP-800B (Log P value: 3.32):
Octoxypolyethylene Glycol Polypropylene Glycol Monomethacrylate (average molar number of addition of ethyleneoxide: 8; average molar number of addition of propyleneoxide: 6; end group: 2-ethylhexyl; "BLEMMER 50POEP-800B" (tradename) available from NOF Corporation.

The Log P value of the polymer produced in Production Example 1 (methacrylic acid/benzyl methacrylate/styrene macromer/styrene/M-90G/PP-500=10 parts/40 parts/15 parts/10 parts/5 parts/20 parts) was measured by the following method.

The Log P values of methacrylic acid, benzyl methacrylate and styrene were 0.99 (Mw: 86), 2.98 (Mw: 176) and 2.89 (Mw: 104), respectively, and the styrene macromer had a methacrylic acid base structure to which about 57 mol of styrene was added. Therefore, the Log P value of the polymer calculated from these data was 165.72 ($=0.99+57 \times 2.89$).

M-90G: Polyethylene Glycol Monomethacrylate (average molar number of addition of ethyleneoxide: 9)

M-90G having a methacryloyloxy group, containing 9 mol of ethyleneoxide added thereto and further having a methyl end group, had such a base structure composed of methacrylic acid to which 9 mol of ethyleneoxide was added. Since the Log P values of ethyleneoxide and methacrylic acid were −0.27 and 0.99, respectively, the Log P value of M-90G calculated from these data was −0.89 ($=0.99-0.27 \times 9+0.55$; Mw: 496).

PP-500: Polypropylene Glycol Monomethacrylate (average molar number of addition of propyleneoxide: 9)

PP-500 having a methacryloyloxy group, containing 9 mol of propyleneoxide added thereto and further having a hydrogen atom as an end group, had such a base structure composed of methacrylic acid to which 9 mol of propyleneoxide was added. Since the Log P values of propyleneoxide and methacrylic acid were 0.14 and 0.99, respectively, the Log P value of PP-500 calculated from these data was 2.25 ($=0.99+0.14 \times 9$; Mw: 608).

Accordingly, since the Log P value of the polymer is a sum of values obtained by multiplying the Log P value by mol % of the respective monomers, the following calculation result is attained.

$$10/86+15/6000+40/176+10/104+5/496+20/608=0.485 \therefore 3.20[=0.99 \times 10/86/0.485+2.98 \times 40/176/0.485+165.72 \times 15/6000/0.485+2.89 \times 10/104/0.485-0.89 \times 5/496/0.485+2.25 \times 20/608/0.485]$$

The Log P values of the polymers obtained in Production Examples 2 to 4 were determined by the same method as in Production Example 1. The results are shown in Table 1.

TABLE 1

| Kind of Monomer | Log P value | Mw | Production Examples | | | |
|---|---|---|---|---|---|---|
| | | | 1 | 2 | 3 | 4 |
| (a) Methacrylic acid | 0.99 | 86 | 10 | 11 | 13 | 13 |
| (b) Styrene monomer | 165.72 | 6000 | 15 | 10 | 10 | 10 |
| (c) Benzyl methacrylate | 2.98 | 176 | 40 | 10 | 10 | 10 |
| (c) Styrene | 2.89 | 104 | 10 | 39 | 37 | 37 |
| (d) M-90G | −0.89 | 496 | 5 | | | |

TABLE 1-continued

|  | Log P value | Mw | Production Examples 1 | 2 | 3 | 4 |
|---|---|---|---|---|---|---|
| (d) PP-500 | 2.25 | 608 | 20 | | | |
| (d) PP-800 | 2.67 | 782 | | 30 | | 15 |
| (d) 50POEP-800B | 3.32 | 898 | | | 30 | 15 |
| Weight-average molecular weight | | | 150,000 | 150,000 | 120,000 | 140,000 |
| Log P value | | | 3.20 | 2.93 | 2.90 | 2.90 |

Note:
The unit for composition of monomers is parts by weight.

Example 1

Twenty five parts of the polymer produced by drying the polymer solution obtained in Production Example 1 under reduced pressure was dissolved in 70 parts of methyl ethyl ketone. Further, 4.1 parts of a neutralizing agent (a 5N sodium hydroxide aqueous solution) and 230 parts of ion-exchanged water were added to the resultant solution to neutralize a salt-forming group of the polymer (degree of neutralization: 60%), and then 75 parts of a quinacridone pigment (C.I. Pigment Violet 19 "Hostaperm Red E5B02 (tradename)" available from Clariant Japan Co., Ltd.) was added into the reaction solution and mixed with each other at 20° C. for 1 h using disper blades. The thus obtained mixture was dispersed under a pressure of 200 MPa by passing through a dispersing apparatus "MICROFLUIDIZER" (tradename) available from Microfluidics Corp., 10 times.

The resultant dispersion was mixed with 250 parts of ion-exchanged water under stirring, and then methyl ethyl ketone was removed from the resultant mixture under reduced pressure at 60° C., followed by removing a part of water therefrom. The obtained mixture was filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion of pigment-containing vinyl polymer particles having a solid content of 20%.

Forty parts of the thus obtained water dispersion of pigment-containing vinyl polymer particles was mixed with 1 part of tricresyl phosphate (Log P value: 4.90) under stirring to incorporate at least a part of the tricresyl phosphate in the polymer particles. The resultant mixed solution was mixed with 10 parts of glycerol, 7 parts of triethylene glycol monobutyl ether (TEGMBE), 1 part of "SURFYNOL 465" available from Nissin Chemical Industry Co., Ltd., 0.3 part of "Ploxel XL2" available from Avecia KK, and 40.7 parts of ion-exchanged water, and the resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water-based ink as shown in Table 2.

Example 2

Twenty five parts of the polymer produced by drying the polymer solution obtained in Production Example 1 under reduced pressure was dissolved in 70 parts of methyl ethyl ketone. Further, 12.5 parts of tricresyl phosphate, 4.1 parts of a neutralizing agent (a 5N sodium hydroxide aqueous solution) and 230 parts of ion-exchanged water were added to the resultant solution to neutralize a salt-forming group of the polymer (degree of neutralization: 60%), and then 75 parts of a quinacridone pigment (C.I. Pigment Violet 19 "Hostaperm Red E5B02 (tradename)" available from Clariant Japan Co., Ltd.) was added into the reaction solution and mixed with each other at 20° C. for 1 h using disper blades. The thus obtained mixture was dispersed under a pressure of 200 MPa by passing through a dispersing apparatus "MICROFLUIDIZER" (tradename) available from Microfluidics Corp., 10 times.

The resultant dispersion was mixed with 250 parts of ion-exchanged water under stirring, and then methyl ethyl ketone was removed from the resultant mixture under reduced pressure at 60° C., followed by removing a part of water therefrom. The obtained mixture was filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion of pigment-containing vinyl polymer particles having solid content (including tricresyl phosphate) of 22.5%.

Forty parts of the thus obtained water dispersion of pigment-containing vinyl polymer particles was mixed with 10 parts of glycerol, 7 parts of triethylene glycol monobutyl ether (TEGMBE), 1 part of "SURFYNOL 465", 0.3 part of "Ploxel XL2", and 41.7 parts of ion-exchanged water, and the resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining the water-based ink as shown in Table 2.

Example 3 and 4

The same procedure as in Example 1 was repeated except for using dibutyl phthalate (Log P value: 4.61) or dibutyl sebacate (Log P value: 6.30) in place of tricresyl phosphate, thereby producing the water-based ink as shown in Table 2.

Comparative Example 1

The same procedure as in Example 1 was repeated except that no tricresyl phosphate was added and 41.7 parts of ion-exchanged water was added, thereby producing the water-based ink as shown in Table 2.

Comparative Example 2 and 3

The same procedure as in Example 1 was repeated except for using butyl oleate (Log P value: 9.49) or 2-ethylhexyl palmitate (Log P value: 10.33) in place of tricresyl phosphate, thereby producing the water-based ink as shown in Table 2.

As a result, it was confirmed that the average particle size of the particles contained in any of the water dispersions obtained in Examples 1 to 4 and Comparative Examples 1 to 3 was in the range of from 0.05 to 0.2 μm.

Next, ink characteristics of the respective water-based inks obtained in Examples 1 to 4 and Comparative Examples 1 to 3 were measured by the following methods. The results are shown in Table 2.

(1) Optical Density

Solid image printing was carried out on a woodfree ordinary paper "KA4250NT (tradename)" available from Seiko Epson Co., Ltd., using an ink-jet printer "Model EM-930C" (piezoelectric type) available from Seiko Epson Co., Ltd., under the following printing conditions:

Kind of Paper: Ordinary Paper; and
Mode set: Photo

After allowing the printed paper to stand at 25° C. for 24 h, the optical density thereof was measured 5 times using a Macbeth densitometer "RD914" (product number) available from Gretag Macbeth A G., to obtain an average of the measured values. The larger the average value, the higher the optical density became.

(2) Gloss

Solid image printing was carried out on a coated paper (photographic paper <glossy> "KA450PSK (tradename)" having a 60° gloss of 41 which was available from Seiko Epson Co., Ltd., using the above ink-jet printer under the following printing conditions:

Kind of Paper: Photo Printing Paper; and
Mode set: Photo

After allowing the printed paper to stand at 25° C. for 24 h, the 20° gloss thereof was measured 5 times using a glossmeter "HANDY GLOSSMETER" (tradename; product number: PG-1) available from Nippon Denshoku Industries Co., Ltd., to obtain an average of the measured values. The larger the average value, the higher the gloss became.

(3) Image Clarity

Solid image printing was carried out on the same coated paper as used in the above (2) using the above ink-jet printer under the same printing conditions as described in the above (2). After allowing the printed paper to stand at 25° C. for 24 h, the 45° image clarity C (%) (comb width: 2.0 mm) was measured 3 times using an image clarity measuring apparatus "Touch Panel-Type Image Clarity Meter (tradename)" (product number: ICM-IT) available from Suga Testing Machine Co., Ltd., to obtain an average of the measured values.

The "image clarity" used herein means a measured value for a clearness or distortion of images reflected on the print. The larger the image clarity value, the more excellent the clearness of images reflected and the less the distortion of images reflected became so that the images reflected were observed more naturally.

(4) Method for Measuring Correlation Distance

Solid image printing was carried out on the same coated paper as used in the above (2) using the above ink-jet printer under the same printing conditions as described in the above (2) (100% duty solid printing; ink size: 3 pl; resolution: 1440 dpi×720 dpi; under the conditions, an amount of ink ejected per unit area was 1.8 mg/cm$^2$). After allowing the resultant print to stand at 25° C. for 24 h, the distribution of amount of light reflected on the printed surface when irradiated with a laser from the direction perpendicular to the printed surface was measured using an ultra-depth profile measuring microscope "VK-8500" available from Keyence Corp.

In the above measuring method, the print was fixed on a slide glass by a double-sided adhesive tape, and the slide glass was fitted to the measuring apparatus such that the printing direction (moving direction of the printing head) was aligned with the lateral direction of the measuring apparatus. The measuring conditions were as follows:

Laser: 685 nm (0.45 mW); objective lens: magnification: ×20; measuring region: 740 μm×550 μm (1024×768 pixels when a size of one pixel is 0.728 μm×0.728 μm)

From the thus obtained two-dimensional light amount distribution, the auto-correlation function R(a) in the direction perpendicular to the printing direction was calculated. Further, the distance at which the auto-correlation function R(a) was 1/e was calculated from the plotted values thereof, and the correlation distance in the direction perpendicular to the printing direction was determined. Meanwhile, in all of the samples measured, the auto-correlation function was able to be approximated by an exponential function thereof in the range of from 0 to 50 μm.

FIG. 1 shows a plotting diagram of the auto-correlation function R(a) (Example 1 and Comparative Example 1).

As read out from FIG. 1, it was recognized that the distance at which the auto-correlation function R(a) was equal to 1/e was 5.0 μm in Example 1, and 2.5 μm in Comparative Example 1.

TABLE 2

|  | Examples | | | | Comparative Example | | |
| --- | --- | --- | --- | --- | --- | --- | --- |
|  | 1 | 2 | 3 | 4 | 1 | 2 | 3 |
| Composition of ink | | | | | | | |
| Production Examples for polymer particles | 1 | 1 | 1 | 1 | 1 | 1 | 1 |
| Degree of neutralization (%) | 75 | 75 | 75 | 75 | 75 | 75 | 75 |
| Pigment C.I. No. | PV19 | PV19 | PV19 | PV19 | PV19 | PV19 | PV19 |
| Solid content of water dispersion (wt %) | 8 | 9* | 8 | 8 | 8 | 8 | 8 |
| Tricresyl phosphate | 1 | | | | | | |
| Dibutyl phthalate | | | 1 | | | | |
| Dibutyl sebacate | | | | 1 | | | |
| Butyl oleate | | | | | | 1 | |
| 2-ethylhexyl palmitate | | | | | | | 1 |
| Glycerol (wt %) | 10 | 10 | 10 | 10 | 10 | 10 | 10 |
| TEGMBE (wt %) | 7 | 7 | 7 | 7 | 7 | 7 | 7 |
| SURFYNOL 465 (wt %) | 1 | 1 | 1 | 1 | 1 | 1 | 1 |
| PLOXEL XL2 (wt %) | 0.3 | 0.3 | 0.3 | 0.3 | 0.3 | 0.3 | 0.3 |
| Ion-exchanged water (wt %) | 72.7 | 72.7 | 72.7 | 72.7 | 73.7 | 72.7 | 72.7 |

TABLE 2-continued

|  | Examples | | | | Comparative Example | | |
|---|---|---|---|---|---|---|---|
|  | 1 | 2 | 3 | 4 | 1 | 2 | 3 |
| Ratio of water-insoluble organic compound to polymer | ½ | ½ | ½ | ½ | 0 | 0 | 0 |
| Measured items |  |  |  |  |  |  |  |
| Optical density | 1.22 | 1.22 | 1.22 | 1.24 | 1.22 |  | 1.24 |
| Gloss | 73 | 63 | 72 | 70 | 35 | 22 | 8 |
| Image clarity | 41 | 40 | 40 | 35 | 20 | 15 | 19 |
| Correlation distance (μm) | 5 | 4.1 | 4.5 | 4.4 | 2.5 |  |  |

*Nine parts of solid components contained in water dispersion obtained in Example 2 contained 1 part by weight of tricresyl phosphate.

Examples 5 to 25

The same procedure as in Example 1 was repeated except for using the water-insoluble organic compound shown in Table 3 in place of tricresyl phosphate, thereby producing a water-based ink.

The results of Examples 1 to 4 as well as Examples 5 to 25 are shown in Table 3.

Figure 2:
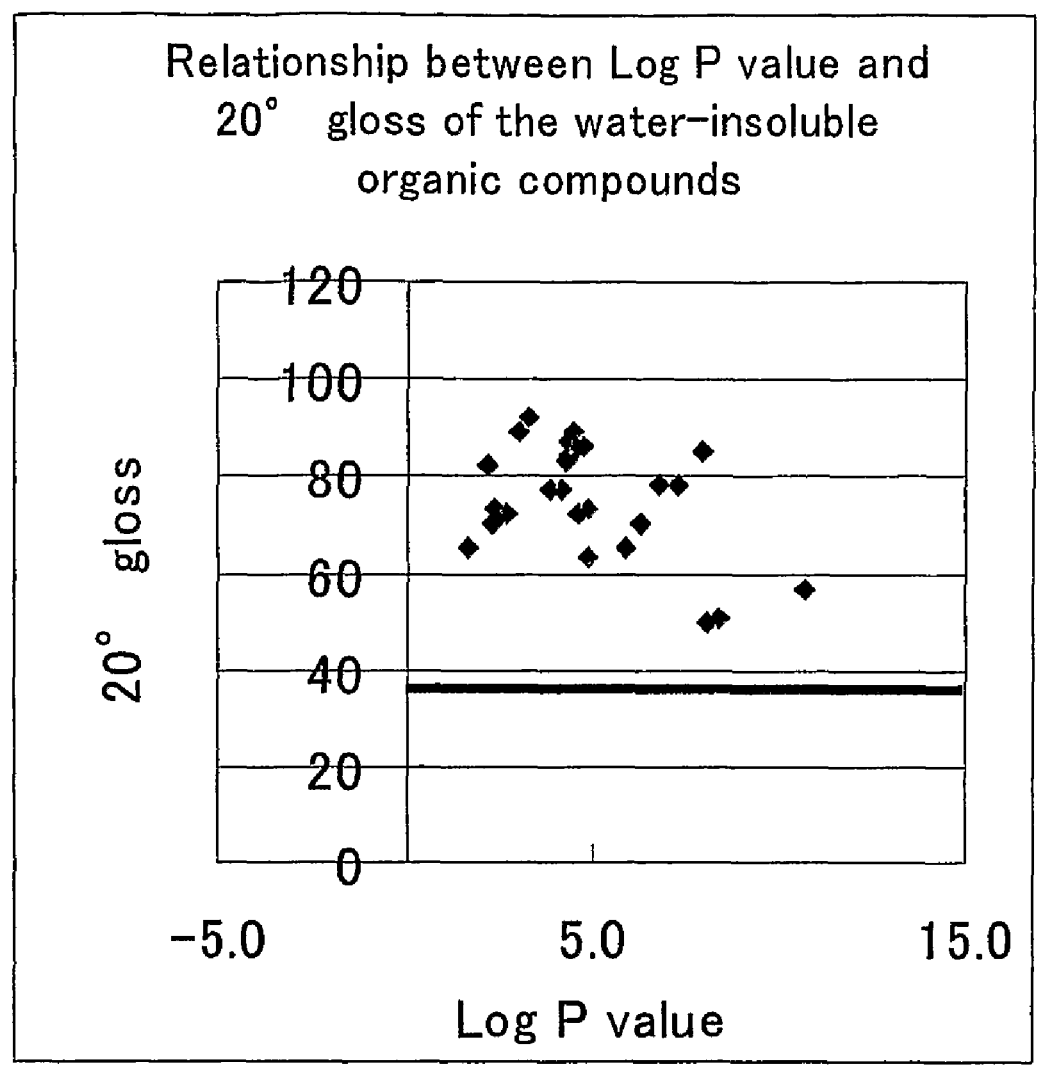
FIG. 2 is a view showing a relationship between Log P value and 20° gloss of the water-insoluble organic compounds obtained in Examples 1 to 25 in which a heavy line represents the 20° gloss (35) of the compound obtained in Comparative Example 1.
Figure 3:
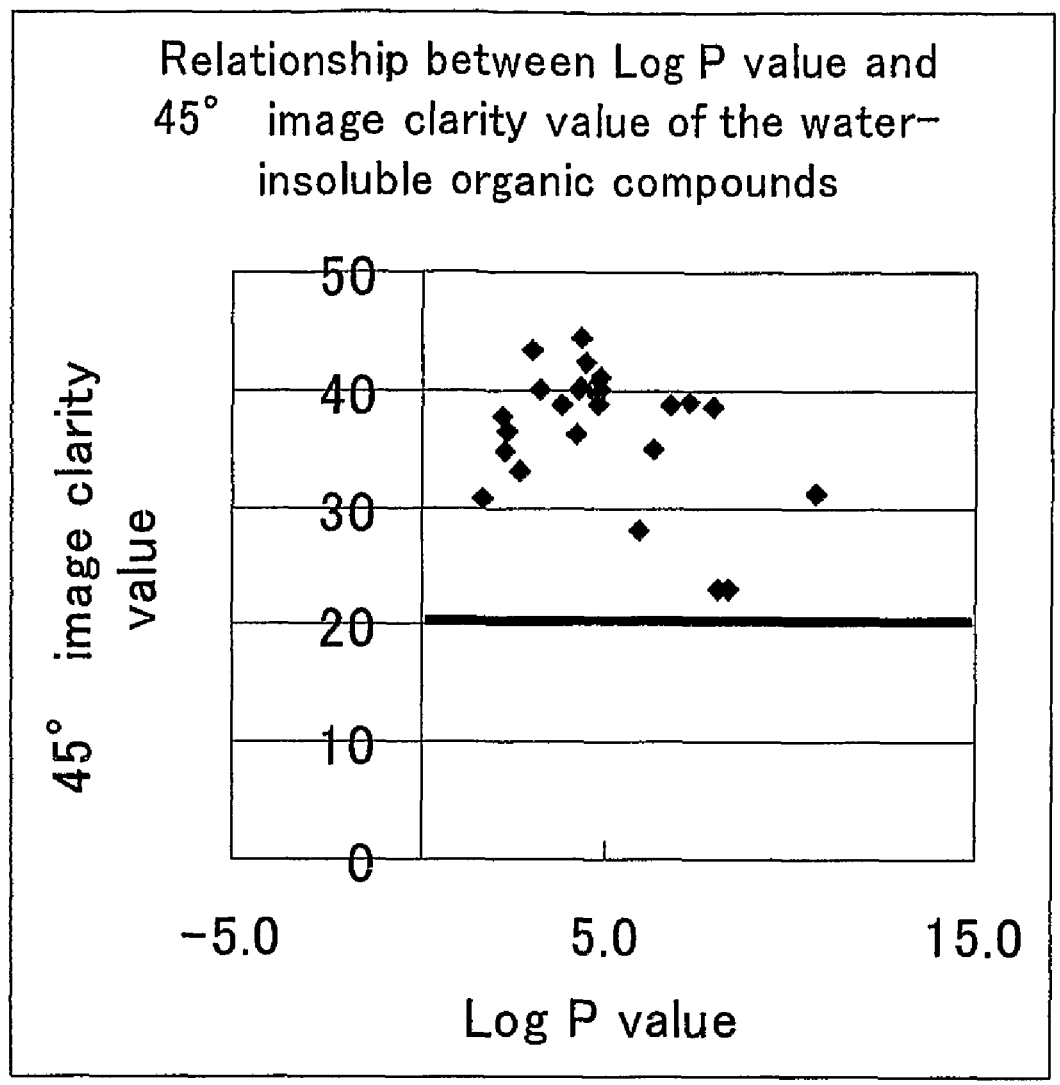
FIG. 3 is a view showing a relationship between Log P value and 45° image clarity value of the water-insoluble organic compounds obtained in Examples 1 to 25 in which a heavy line represents the 45° image clarity value (20) of the compound obtained in Comparative Example 1.

Further, FIG. 2 shows the relationship between the Log P value and 20° gloss of the water-insoluble organic compounds obtained in Examples 1 to 25 wherein the solid line represents a 20° gloss of the compound obtained in Comparative Example 1, whereas FIG. 3 shows the relationship between the Log P value and 45° image clarity value of the water-insoluble organic compounds obtained in Examples 1 to 25 wherein the solid line represents a 45° image clarity value of the compound obtained in Comparative Example 1.

From the results shown in Tables 2 and 3 and FIGS. 2 and 3, it was confirmed that all of the inks obtained in Examples 1 to 25 produced prints having a high optical density when printed on an ordinary paper, and produced prints having excellent gloss and image clarity when printed on a coated paper.

Example 26

Thirty parts of the polymer produced by drying the polymer solution obtained in Production Example 2 under reduced pressure was dissolved in 70 parts of methyl ethyl ketone. Further, 5.4 parts of a neutralizing agent (a 5N sodium hydroxide aqueous solution) and 230 parts of ion-exchanged water were added to the resultant solution to neutralize a salt-forming group of the polymer (degree of neutralization: 60%), and then 70 parts of a quinacridone pigment (magenta:

TABLE 3

|  |  |  | Measuring items | | |
|---|---|---|---|---|---|
| Examples | Water-insoluble organic compound | Log P value | Gloss | Image clarity | Optical density |
| 1 | (3) tricresyl phosphate | 4.90 | 73 | 41 | 1.22 |
| 2 | (3) tricresyl phosphate (included in polymer particles) | 4.90 | 63 | 40 | 1.22 |
| 3 | (2) dibutyl phthalate | 4.61 | 72 | 40 | 1.22 |
| 4 | (1) dibutyl sebacate | 6.30 | 70 | 35 | 1.24 |
| 5 | (1) diethyl adipate | 2.37 | 73 | 36 | 1.23 |
| 6 | (1) dibutyl adipate | 4.33 | 84 | 44 | 1.20 |
| 7 | (1) diisobutyl adipate | 4.19 | 77 | 36 | 1.20 |
| 8 | (1) bis(2-ethylhexyl)adipate | 8.12 | 50 | 23 | 1.26 |
| 9 | (1) bis(butyldiglycol)adipate | 3.24 | 92 | 40 | 1.22 |
| 10 | (1) diethyl sebacate | 4.33 | 87 | 40 | 1.19 |
| 11 | (1) bis(octoxypolyethylene glycol) adipate*1 | 5.92 |  |  | — |
| 12 | (2) dimethyl phthalate | 1.66 | 65 | 31 | — |
| 13 | (2) diethyl phthalate | 2.65 | 72 | 33 | 1.20 |
| 14 | (2) diisobutyl phthalate | 4.46 | 89 | 42 | 1.19 |
| 15 | (2) bis(2-ethylhexyl)phthalate | 8.39 | 51 | 23 | 1.22 |
| 16 | (2) ethylphthalyl ethyl glycolate | 2.19 | 82 | 38 | 1.24 |
| 17 | (2) octylbenzyl phthalate | 6.79 | 78 | 39 | 1.19 |
| 18 | (2) nonylbenzyl phthalate | 7.30 | 78 | 39 | 1.18 |
| 19 | (2) stearylbenzyl phthalate | 10.74 | 57 | 31 | — |
| 20 | (3) tributyl phosphate | 3.82 | 77 | 39 | — |
| 21 | (3) trixylenyl phosphate | 7.98 | 85 | 38 | 1.22 |
| 22 | (3) tris(butoxyethyl)phosphate | 3.00 | 89 | 43 | 1.23 |
| 23 | (3) cresyl diphenyl phosphate | 4.77 | 86 | 39 | 1.21 |
| 24 | (5) tributyl o-acetylcitrate | 4.29 | 83 | 40 | 1.20 |
| 25 | (8) N-butylbenzene sulfonamide | 2.31 | 70 | 35 | — |

Note:
Numerals in parenthesis indicate numbers assigned to the respective water-insoluble organic compounds in the present specification.
*1In the formula (1), $R^1$ and $R^2$ both are 2-ethylhexyl; AO = EO; n = 4

M) (C.I. Pigment Violet 19 (P.V. 19) "Hostaperm Red E5B02 (tradename)" available from Clariant Japan Co., Ltd.) was added into the reaction solution and mixed with each other at 20° C. for 1 h using disper blades. The thus obtained mixture was dispersed under a pressure of 200 MPa by passing through a dispersing apparatus "MICROFLUIDIZER" (tradename) available from Microfluidics Corp., 10 times.

The resultant dispersion was mixed with 250 parts of ion-exchanged water under stirring, and then methyl ethyl ketone was removed from the resultant mixture under reduced pressure at 60° C., followed by removing a part of water therefrom. The obtained mixture was filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion of pigment-containing vinyl polymer particles having a solid content of 20%.

Forty parts of the thus obtained water dispersion of pigment-containing vinyl polymer particles was mixed with 1 part of dibutyl sebacate (Log P value: 6.30) under stirring to incorporate at least a part of the dibutyl sebacate in the polymer particles. The resultant mixed solution was mixed with 10 parts of glycerol, 7 parts of triethylene glycol monobutyl ether, 1 part of "SURFYNOL 465" available from Nissin Chemical Industry Co., Ltd., 0.3 part of "Ploxel XL2" available from Avecia K K, and 40.7 parts of ion-exchanged water, and the resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle to remove coarse particles therefrom, thereby obtaining the water-based ink as shown in Table 4.

Ink characteristics of the thus obtained water-based ink were measured by the same method as described above. The results are shown in Table 4.

Example 27

The same procedure as in Production Example 1 was repeated except for using 35 parts of the polymer produced by drying the polymer solution obtained in Production Example 3 under reduced pressure, 65 parts of a diazo pigment (yellow: Y) (C.I. Pigment Yellow 74 (P.Y. 74) "FY7413 (tradename)" available from Sanyo Pigment Co., Ltd.) and 7.5 parts of a neutralizing agent (a 5N sodium hydroxide aqueous solution) which was used in an amount capable of achieving a degree of neutralization of 60%, thereby producing the water dispersion of pigment-containing vinyl polymer particles having a solid content of 20%.

Further, the same procedure as in Production Example 2 was repeated except for using 43.07 parts of the thus obtained water dispersion of pigment-containing vinyl polymer particles and 37.63 parts of ion-exchanged water, thereby producing the water-based ink shown in Table 4.

Ink characteristics of the thus obtained water-based ink were measured by the same method as described above. The results are shown in Table 4.

Example 28

The same procedure as in Production Example 1 was repeated except for using 40 parts of the polymer produced by drying the polymer solution obtained in Production Example 4 under reduced pressure, 60 parts of a phthalocyanine pigment (cyan: C) (C.I. Pigment Blue 15:4 (P.B. 15:4) "LIONOGEN BLUE BGJ (tradename)" available from Toyo Ink Seizo Co., Ltd.) and 8.6 parts of a neutralizing agent (a 5N sodium hydroxide aqueous solution) which was used in an amount capable of achieving a degree of neutralization of 60%, thereby producing the water dispersion of pigment-containing vinyl polymer particles having a solid content of 20%.

Further, the same procedure as in Production Example 2 was repeated except for using 33.33 parts of the thus obtained water dispersion of pigment-containing vinyl polymer particles and 47.37 parts of ion-exchanged water, thereby producing the water-based ink shown in Table 4.

Ink characteristics of the thus obtained water-based ink were measured by the same method as described above. The results are shown in Table 4.

Examples 29 to 34

The same procedures as in Example 26 for magenta ink, Example 27 for yellow ink and Example 28 for cyan ink were respectively repeated except that the amount of dibutyl sebacate to be mixed with the water dispersion of pigment-containing vinyl polymer particles was changed to those shown in Table 2, and the amount of ion-exchanged water to be mixed with the obtained mixed solution was adjusted such that a total volume of the finally obtained water-based ink was 100 parts, thereby producing the water-based inks shown in Table 4.

Ink characteristics of the thus obtained water-based inks were measured by the same method as described above. The results are shown in Table 4.

Examples 35 to 37

The same procedures as in Examples 26 to 28 were respectively repeated except for using octylbenzyl phthalate (Log P value: 6.79) in place of dibutyl sebacate, thereby producing the water-based inks shown in Table 4.

Ink characteristics of the thus obtained water-based inks were measured by the same method as described above. The results are shown in Table 4.

TABLE 4

| | Examples | | | | | |
|---|---|---|---|---|---|---|
| | 26 | 27 | 28 | 29 | 30 | 31 |
| | Production Examples | | | | | |
| | 2 | 3 | 4 | 2 | 3 | 4 |
| Rate of pigment | Degree of neutralization of polymer (%) | | | | | |
| introduced (%) | 60 | 60 | 60 | 60 | 60 | 60 |
| P.V. 19 | 70 | | | 70 | | |
| P.Y. 74 | | 65 | | | 65 | |
| P.B. 15:4 | | | 60 | | | 60 |
| Dibutyl sebacate (%) | 1.0 | 1.0 | 1.0 | 1.5 | 1.5 | 1.5 |
| Octylbenzyl phthalate (%) | | | | | | |
| Evaluation for single color | M | Y | C | M | Y | C |
| Optical density | 1.24 | 1.28 | 1.12 | 1.23 | 1.26 | 1.11 |
| Gloss | 75 | 78 | 65 | 77 | 79 | 67 |
| Image clarity | 50 | 51 | 59 | 52 | 53 | 62 |

TABLE 4-continued

| | Examples | | | | | |
|---|---|---|---|---|---|---|
| | 32 | 33 | 34 | 35 | 36 | 37 |
| | Production Examples | | | | | |
| | 2 | 3 | 4 | 2 | 3 | 4 |
| Rate of pigment | Degree of neutralization of polymer (%) | | | | | |
| introduced (%) | 60 | 60 | 60 | 60 | 60 | 60 |
| P.V. 19 | 70 | | | 70 | | |
| P.Y. 74 | | 65 | | | 65 | |
| P.B. 15:4 | | | 60 | | | 60 |
| Dibutyl sebacate (%) | 0.5 | 0.5 | 0.5 | | | |
| Octylbenzyl phthalate (%) | | | | 1.0 | 1.0 | 1.0 |
| Evaluation for single color | M | Y | C | M | Y | C |
| Optical density | 1.24 | 1.28 | 1.11 | 1.23 | 1.27 | 1.11 |
| Gloss | 68 | 70 | 52 | 76 | 79 | 60 |
| Image clarity | 45 | 46 | 54 | 51 | 52 | 55 |

Note:
Rate of pigment introduced (%) = {pigment (wt %)/[polymer (wt %) + pigment (wt %)]} × 100

Comparative Examples 4 to 6

The same procedures as in Examples 26 to 28 were respectively repeated except for using no water-insoluble organic compound, thereby producing the water-based inks shown in Table 5.

Ink characteristics of the thus obtained water-based inks were measured by the same method as described above. The results are shown in Table 5.

TABLE 5

| | Comparative Examples | | |
|---|---|---|---|
| | 4 | 5 | 6 |
| | Production Examples | | |
| | 2 | 3 | 4 |
| Rate of pigment | Degree of neutralization of polymer (%) | | |
| introduced (%) | 60 | 60 | 60 |
| P.V. 19 | 70 | | |
| P.Y. 74 | | 65 | |
| P.B. 15:4 | | | 60 |
| Evaluation for single color | M | Y | C |
| Optical density | 1.22 | 1.27 | 1.10 |
| Gloss | 38 | 42 | 36 |
| Image clarity | 22 | 24 | 25 |

Ink Production Example 1

Thirty parts of the polymer produced by drying the polymer solution obtained in Production Example 2 under reduced pressure was dissolved in 70 parts of methyl ethyl ketone. Further, a neutralizing agent (a 5N sodium hydroxide aqueous solution) in an amount capable of achieving a degree of neutralization of 60%, and 230 parts of ion-exchanged water were added to the resultant solution to neutralize a salt-forming group of the polymer, and then 70 parts of a quinacridone pigment (magenta: M) (C.I. Pigment Violet 19 (P. V. 19) "Hostaperm Red E5B02 (tradename)" available from Clariant Japan Co., Ltd.) was added into the reaction solution and mixed with each other at 20° C. for 1 h using disper blades. The thus obtained mixture was dispersed under a pressure of 200 MPa by passing through a dispersing apparatus "MICROFLUIDIZER" (tradename) available from Microfluidics Corp., 10 times.

The resultant dispersion was mixed with 250 parts of ion-exchanged water under stirring, and then methyl ethyl ketone was removed from the resultant mixture under reduced pressure at 60° C., followed by removing a part of water therefrom. The obtained mixture was filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion of pigment-containing graft polymer particles having a solid content of 20%.

Forty parts of the thus obtained water dispersion of pigment-containing graft polymer particles was mixed with 1 part of dibutyl sebacate (Log P value: 6.30) under stirring to incorporate the dibutyl sebacate in the polymer particles. The resultant mixed solution was mixed with 10 parts of glycerol, 7 parts of triethylene glycol monobutyl ether, 1 part of "SUR-FYNOL 465" available from Nissin Chemical Industry Co., Ltd., 0.3 part of "Ploxel XL2" available from Avecia K, and 40.7 parts of ion-exchanged water, and the resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle to remove coarse particles therefrom, thereby obtaining the water-based ink as shown in Tables 6 to 8.

Ink Production Example 2

The same procedure as in Production Example 1 was repeated except for using 35 parts of the polymer produced by drying the polymer solution obtained in Production Example 3 under reduced pressure and 65 parts of a diazo pigment (yellow: Y) (C.I. Pigment Yellow 74 (P. Y. 74) "FY7413 (tradename)" available from Sanyo Pigment Co., Ltd. ), thereby producing the water dispersion of pigment-containing graft polymer particles having a solid content of 20%.

Further, the same procedure as in Production Example 1 was repeated except for using 43.07 parts of the thus obtained water dispersion of pigment-containing graft polymer particles and 37.63 parts of ion-exchanged water, thereby producing the water-based ink shown in Tables 6 to 8.

Ink Production Example 3

The same procedure as in Production Example 1 was repeated except for using 40 parts of the polymer produced by drying the polymer solution obtained in Production Example 4 under reduced pressure and 60 parts of a phthalocyanine pigment (cyan: C) (C.I. Pigment Blue 15:4 (P. B. 15:4) "LIONOGEN BLUE BGJ (tradename)" available from Toyo Ink Seizo Co., Ltd.), thereby producing the water dispersion of pigment-containing graft polymer particles having a solid content of 20%.

Further, the same procedure as in Production Example 1 was repeated except for using 33.33 parts of the thus obtained water dispersion of pigment-containing graft polymer particles and 47.37 parts of ion-exchanged water, thereby producing the water-based ink shown in Tables 6 and 7.

Ink Production Examples 4 to 12

The same procedures as in Ink Production Example 1 for magenta ink, Ink Production Example 2 for yellow ink and Ink Production Example 3 for cyan ink were respectively repeated except that the amount of dibutyl sebacate to be mixed with the water dispersion of pigment-containing graft polymer particles was changed to those shown in Table 2, and the amount of ion-exchanged water to be mixed with the obtained mixed solution was adjusted such that a total volume of the finally obtained water-based ink was 100 parts, thereby producing the water-based inks shown in Tables 6 and 7.

Ink Production Examples 13 to 15

The same procedures as in Ink Production Examples 1 to 3 were respectively repeated except for using octylbenzyl phthalate (Log P value: 6.79) in place of dibutyl sebacate, thereby producing the water-based inks shown in Table 6.

Examples 35 to 41 and Comparative Examples 7 and 8

Using the inks obtained in Ink Production Examples 1 to 15, composite black (RGB values: R: 0; G: 0; B: 0) as well as secondary colors, i.e., red (RGB values: R: 255; G: 0; B: 0), green (RGB values: R: 0; G: 128; B: 0) and blue (RGB values: R: 0; G: 0; B: 255) were respectively printed on a commercially available ink-jet photographic paper "KA450PSK" (tradename) available from Seiko Epson Co., Ltd. The surface tension and contact angle of the obtained ink images were measured by the following methods to evaluate a gloss and an image clarity thereof. The results are shown in Tables 6 and 7.

In Tables, M, Y and C mean magenta, yellow and cyan, respectively (this definition is similarly applied to the following descriptions).

Measurement of Surface Tension

The surface tension of ink was measured at 25° C. using a dynamic surface tension meter "CBVP-Z" (tradename) available from Kyowa Kaimen Kagaku Co., Ltd.

Measurement of Contact Angle

One second after ejecting ink in an amount of 1 nL onto a recording medium (ink-jet photographic paper <glossy> "KA450PSK" (tradename) available from Seiko Epson Co., Ltd.; 60° gloss: 41) from a capillary having an inner diameter of 30 μm which was disposed apart by 120 μm from the recording medium, the contact angle of the ink droplet on the recording medium was measured at 25° C. using an automatic micro contact angle meter "MCA-1" (tradename) available from Kyowa Kaimen Kagaku Co., Ltd.

Evaluation of Gloss

Solid image printing was carried out on a commercially available ink-jet photographic paper (ink-jet photographic paper <glossy> "KA450PSK (tradename)" available from Seiko Epson Co., Ltd.) using a commercially available ink-jet printer ("Model PX-V600"; piezoelectric type; available from Seiko Epson Co., Ltd.) under the following printing conditions:

Kind of Paper: Photographic Paper (half tone); and
Mode set: Photo

After allowing the printed paper to stand at 25° C. for 24 h, the 20° gloss thereof was measured 5 times using a glossmeter "HANDY GLOSSMETER" (tradename; product number: PG-1) available from Nippon Denshoku Industries Co., Ltd., to obtain an average of the measured values.

[Evaluation Criteria]
○: 50 or more
Δ: not less than 40 but less than 50
X: less than 40

Evaluation of Image Clarity

Solid image printing was carried out on the above commercially available ink-jet photographic paper using the above ink-jet printer. After allowing the printed paper to stand at 25° C. for 24 h, the image clarity C value (comb width: 2.0 mm) was measured 3 times by an image clarity measuring apparatus "Touch Panel-Type Image Clarity Meter (tradename)" (product number: ICM-IT) available from Suga Testing Machine Co., Ltd., to obtain an average of the measured values.

[Evaluation Criteria]
○: 35 or more
Δ: not less than 26 but less than 35
X: less than 26

The "image clarity" used herein means a measured value for a clearness or distortion of images reflected on the print. The larger the image clarity value, the more excellent the clearness of images reflected and the less the distortion of images reflected became so that the images reflected were observed more naturally.

TABLE 6

| | Examples | | | | | |
|---|---|---|---|---|---|---|
| | Example 35 | | | Example 36 | | |
| | Ink Production Examples | | | | | |
| | 1 | 2 | 3 | 4 | 5 | 6 |
| | Polymer Production Examples | | | | | |
| Rate of pigment introduced (%) | 2 | 3 | 4 | 2 | 3 | 4 |
| | M | Y | C | M | Y | C |
| P.V. 19 | 70 | | | 70 | | |
| P.Y. 74 | | 65 | | | 65 | |
| P.B. 15:4 | | | 60 | | | 60 |
| Dibutyl sebacate (%) | 1.0 | 1.0 | 1.0 | 1.5 | 1.5 | 1.5 |
| Octylbenzyl phthalate (%) | | | | | | |
| Surface tension of ink (mN/m) | 32 | 30 | 31 | 30 | 29 | 30 |
| Contact angle of ink (°) | 42 | 38 | 45 | 41 | 40 | 46 |
| Evaluation of secondary color | R | G | B | R | G | B |
| 20° gloss | ○76 | ○55 | ○60 | ○77 | ○58 | ○63 |
| Image clarity value | ○44 | ○45 | ○40 | ○45 | ○47 | ○41 |

TABLE 6-continued

| | | | | | | |
|---|---|---|---|---|---|---|
| Evaluation of CB | Composite black | | | Composite black | | |
| 20° gloss | ○70 | | | ○72 | | |
| Image clarity value | ○40 | | | ○41 | | |

| | Examples | | | | | |
|---|---|---|---|---|---|---|
| | Example 37 | | | Example 38 | | |
| | Ink Production Examples | | | | | |
| | 7 | 8 | 9 | 1 | 10 | 3 |
| | Polymer Production Examples | | | | | |
| Rate of pigment introduced (%) | 2 | 3 | 4 | 2 | 3 | 4 |
| | M | Y | C | M | Y | C |
| P.V. 19 | 70 | | | 70 | | |
| P.Y. 74 | | 65 | | | 65 | |
| P.B. 15:4 | | | 60 | | | 60 |
| Dibutyl sebacate (%) | 0.5 | 0.5 | 0.5 | 1.0 | 0.0 | 1.0 |
| Octylbenzyl phthalate (%) | | | | | | |
| Surface tension of ink (mN/m) | 33 | 30 | 31 | 32 | 29 | 31 |
| Contact angle of ink (°) | 38 | 32 | 41 | 42 | 9 | 45 |
| Evaluation of secondary color | R | G | B | R | G | B |
| 20° gloss | ○65 | ○50 | ○52 | Δ58 | Δ48 | ○57 |
| Image clarity value | ○40 | ○41 | ○38 | Δ34 | Δ31 | ○38 |
| Evaluation of CB | Composite black | | | Composite black | | |
| 20° gloss | ○66 | | | ○65 | | |
| Image clarity value | ○38 | | | ○37 | | |

| | Examples | | | | | |
|---|---|---|---|---|---|---|
| | Example 39 | | | Example 40 | | |
| | Ink Production Examples | | | | | |
| | 11 | 2 | 3 | 1 | 2 | 12 |
| | Polymer Production Examples | | | | | |
| Rate of pigment introduced (%) | 2 | 3 | 4 | 2 | 3 | 4 |
| | M | Y | C | M | Y | C |
| P.V. 19 | 70 | | | 70 | | |
| P.Y. 74 | | 65 | | | 65 | |
| P.B. 15:4 | | | 60 | | | 60 |
| Dibutyl sebacate (%) | 0.0 | 1.0 | 1.0 | 1.0 | 1.0 | 0.0 |
| Octylbenzyl phthalate (%) | | | | | | |
| Surface tension of ink (mN/m) | 32 | 30 | 31 | 32 | 30 | 31 |
| Contact angle of ink (°) | 10 | 38 | 45 | 42 | 38 | 14 |
| Evaluation of secondary color | R | G | B | R | G | B |
| 20° gloss | ○50 | ○55 | ○52 | ○76 | Δ43 | ○57 |
| Image clarity value | Δ33 | ○45 | Δ34 | ○44 | Δ29 | ○38 |
| Evaluation of CB | Composite black | | | Composite black | | |
| 20° gloss | ○63 | | | ○60 | | |
| Image clarity value | ○35 | | | ○35 | | |

| | Examples | | |
|---|---|---|---|
| | Example 41 | | |
| | Ink Production Examples | | |
| | 13 | 14 | 15 |
| | Polymer Production Examples | | |
| Rate of pigment introduced (%) | 2 | 3 | 4 |
| | M | Y | C |
| P.V. 19 | 70 | | |
| P.Y. 74 | | 65 | |
| P.B. 15:4 | | | 60 |
| Dibutyl sebacate (%) | | | |
| Octylbenzyl phthalate (%) | 1.0 | 1.0 | 1.0 |
| Surface tension of ink (mN/m) | 32 | 30 | 31 |
| Contact angle of ink (°) | 42 | 38 | 14 |

TABLE 6-continued

| Evaluation of secondary color | R | G | B |
|---|---|---|---|
| 20° gloss | ○75 | ○53 | ○57 |
| Image clarity value | ○42 | ○43 | ○39 |
| Evaluation of CB | | Composite black | |
| 20° gloss | | ○70 | |
| Image clarity value | | ○39 | |

Note:
Rate of pigment introduced (%) = {pigment (wt %)/[polymer (wt %) + pigment (wt %)]} × 100

TABLE 7

| | Comparative Examples | | | | | |
|---|---|---|---|---|---|---|
| | Comparative Example 7 | | | Comparative Example 8 | | |
| | Ink Production Examples | | | | | |
| | 11 | 10 | 12 | 1 | 10 | 12 |
| | Polymer Production Examples | | | | | |
| Rate of pigment introduced (%) | 1 | 2 | 3 | 1 | 2 | 3 |
| | M | Y | C | M | Y | C |
| P.V. 19 | 70 | | | 70 | | |
| P.Y. 74 | | 65 | | | 65 | |
| P.B. 15:4 | | | 60 | | | 60 |
| Dibutyl sebacate (%) | 0.0 | 0.0 | 0.0 | 1.0 | 0.0 | 0.0 |
| Octylbenzyl phthalate (%) | | | | | | |
| Surface tension of ink (mN/m) | 32 | 29 | 31 | 30 | 29 | 31 |
| Contact angle of ink (°) | 10 | 9 | 14 | 42 | 9 | 14 |
| Evaluation of secondary color | R | G | B | R | G | B |
| 20° gloss | X31 | X35 | X30 | Δ58 | X35 | X35 |
| Image clarity value | X18 | X20 | X20 | Δ34 | X20 | X22 |
| Evaluation of CB | Composite black | | | Composite black | | |
| 20° gloss | | X24 | | | X27 | |
| Image clarity value | | X25 | | | Δ28 | |

Example 42 and Comparative Example 9

Using the inks obtained in Production Examples 1 and 2 (Example 8) or the inks obtained in Production Examples 11 and 10 (Comparative Example 3), images of a secondary red color (RGB values: R: 255; G: 0; B: 0) were printed on a commercially available inkjet photographic paper "KA450PSK" (tradename) available from Seiko Epson Co., Ltd. The obtained printed images were evaluated by the same method as described in Example 1. The results are shown in Table 8.

TABLE 8

| | Example 42 | | Comparative Example 9 | |
|---|---|---|---|---|
| | Ink Production Examples | | | |
| | 1 | 2 | 11 | 10 |
| | Polymer Production Examples | | | |
| Rate of pigment introduced (%) | 1 | 2 | 1 | 2 |
| | M | Y | M | Y |
| P.V. 19 | 70 | | 70 | |
| P.Y. 74 | | 65 | | 65 |
| Dibutyl sebacate (%) | 1.0 | 1.0 | 0.0 | 0.0 |
| Evaluation of secondary color | Red | | Red | |

TABLE 8-continued

| | Example 42 | | Comparative Example 9 | |
|---|---|---|---|---|
| | Ink Production Examples | | | |
| | 1 | 2 | 11 | 10 |
| | Polymer Production Examples | | | |
| Rate of pigment introduced (%) | 1 | 2 | 1 | 2 |
| | M | Y | M | Y |
| 20° gloss | ○78 | | X31 | |
| Image clarity value | ○42 | | X18 | |

From the results shown in Tables 6 to 8, it was confirmed that the ink sets for ink-jet printing obtained in Examples 35 to 42 were able to produce images of secondary colors or composite black having excellent gloss and image clarity, and further the respective inks exhibited a practically sufficient optical density.

INDUSTRIAL APPLICABILITY

The water-based ink containing the water dispersion for ink-jet printing according to the present invention can produce not only images or characters having a sufficient optical density when printed on an ordinary paper, but also images or characters having excellent gloss and image clarity when printed on a coated paper, and is, therefore, suitable as an ink for ink-jet printing.

Also, the print having images or characters printed with the water-based ink of the present invention using an ink-jet printer exhibits excellent gloss and image clarity.

Multi-order colors or composite black printed on an ink-jet photographic paper using the ink set of the present invention by an ink-jet printing method exhibit excellent gloss and image clarity. In addition, in accordance with the process of the present invention, prints having excellent gloss and image clarity can be efficiently produced.

The invention claimed is:
1. A water dispersion for ink jet printing comprising a water dispersion of particles of a vinyl polymer or a polyester-based polymer which contain a colorant (B), which colorant (B) comprises a pigment; and a water-insoluble organic compound (A) except for aliphatic acid derivatives which are aliphatic acid monoester compounds produced from a monovalent aliphatic acid in the form of a saturated or unsaturated alkylcarboxylic acid having 8 to 22 carbon atoms and a monovalent alcohol; aliphatic acid amide compounds produced from the above aliphatic acid and ammonia or a lower amine having 3 or less carbon atoms; or aliphatic acid anhydrides derived from the above aliphatic acid,
wherein the solubility of water-insoluble organic compound (A) in water is 5 g or lower per 100 g of water as measured at 20° C., wherein a part of the water-insoluble organic compound (A) is contained in the particles of the vinyl polymer or the polyester-based polymer, and wherein a weight ratio of the water-insoluble organic compound (A) to the particles of the vinyl polymer or the polyester-based polymer in the water dispersion is from 1/100 to 5/1.

2. The water dispersion for ink-jet printing according to claim 1, wherein the water-insoluble organic compound (A) is an ester or ether compound (f) containing two or more ester or ether bonds in a molecule, and/or an ester or ether compound (g) containing one or more ester or ether bonds and at least one functional group selected from the group consisting of a carboxyl group, a sulfonic group, a phosphoric acid residue, a carbonyl group, an epoxy group and a hydroxyl group.

3. The water dispersion for ink-jet printing according to claim 1, wherein the water-insoluble organic compound (A) is at least one compound selected from the group consisting of phosphoric esters, aliphatic di- or tri-carboxylic esters and aromatic carboxylic esters.

4. The water dispersion for ink-jet printing according to claim 1, wherein a content of the water-insoluble organic compound (A) in the water dispersion is from 0.11 to 10% by weight.

5. The water dispersion for ink jet printing according to claim 1, wherein the water-insoluble organic compound (A) has a Log P value of from −1 to 11.

6. The water dispersion for ink jet printing according to claim 1, wherein a value obtained by subtracting a Log P value of the vinyl polymer or the polyester-based polymer from the Log P value of the water-insoluble organic compound (A) is from −4 to 8.

7. The water dispersion for ink jet printing according to claim 1, wherein the vinyl polymer is present and is a water-insoluble vinyl polymer produced by copolymerizing a monomer mixture containing (a) a salt-forming group-containing monomer, and (b) a macromer and/or (c) a hydrophobic monomer.

8. A water-based ink for ink jet printing comprising the water dispersion as defined in claim 1.

9. A print having characters or images printed with the water-based ink as defined in claim 8 using an ink-jet printer.

10. An ink set for ink jet printing comprising two or more kinds of water-based inks according to claim 8 having different colors from each other.

11. The ink set for ink jet printing according to claim 10, wherein the ink set comprises a magenta ink, a yellow ink and a cyan ink.

12. The ink set for ink jet printing according to claim 10, wherein the inks have a surface tension of 25 to 35 mN/m as measured at 25° C., and when the inks are ejected onto an ink jet photographic paper through an ejection nozzle having an inner diameter of 30 μm and in an ejecting amount of 1 mL, the inks ejected on the paper have a contact angle of 15 to 60° after the elapse of 1 s.

13. A process for producing a print having composite black images or characters, comprising the step of printing the images or characters with the inks of an ink set as defined in claim 10, which comprise a magenta ink, a yellow ink and a cyan ink, on an ink-jet photographic paper by an ink-jet printing method.

14. A process for producing a print having multi-order color images or characters, comprising the step of printing the images or characters with two or more kinds of inks having different colors from each other which are selected from the three inks of an ink set as defined in claim 10, on an ink jet photographic paper by an ink jet printing method.

15. A process for producing a water dispersion for ink-jet printing as defined in claim 1, comprising the following steps (1) to (3):

(1) preparing a mixture containing a water-insoluble polymer, an organic solvent, a colorant and water;

(2) dispersing the mixture obtained in the step (1); and (3) removing the organic solvent from a dispersion obtained in the step (2) to obtain a water dispersion containing particles of the water-insoluble polymer which contain the colorant, wherein a water-insoluble organic compound except for aliphatic acid derivatives is present during or after at least one of the steps (1) to (3).

16. The water dispersion for ink-jet printing according to claim 1, wherein the pigment provides a chromatic color.

* * * * *